US010228233B2

(12) United States Patent
Kimata et al.

(10) Patent No.: US 10,228,233 B2
(45) Date of Patent: Mar. 12, 2019

(54) ROTATION-DETECTING APPARATUS

(71) Applicant: SG CORPORATION, Tokyo (JP)

(72) Inventors: Hideki Kimata, Tokyo (JP); Tomoshi Takatsuka, Tokyo (JP)

(73) Assignee: NSD CORPORATION, Nagoya-Shi (JP)

( * ) Notice: Subject to any disclaimer, the term of this patent is extended or adjusted under 35 U.S.C. 154(b) by 0 days.

(21) Appl. No.: 15/505,730

(22) PCT Filed: Aug. 25, 2014

(86) PCT No.: PCT/JP2014/072169
§ 371 (c)(1),
(2) Date: Feb. 22, 2017

(87) PCT Pub. No.: WO2016/030948
PCT Pub. Date: Mar. 3, 2016

(65) Prior Publication Data
US 2017/0268865 A1 Sep. 21, 2017

(51) Int. Cl.
G01B 7/30 (2006.01)
H02K 11/21 (2016.01)
(Continued)

(52) U.S. Cl.
CPC ............. G01B 7/30 (2013.01); G01D 5/2026 (2013.01); H02K 11/21 (2016.01); H02K 11/33 (2016.01);
(Continued)

(58) Field of Classification Search
CPC . B60K 1/00; B60L 1/00; B60W 10/00; H02K 1/00; H02K 2201/00
See application file for complete search history.

(56) References Cited

U.S. PATENT DOCUMENTS 5,455,498 A * 10/1995 Kakimoto ............. G01D 5/243
318/605
7,518,332 B2 * 4/2009 Nakazawa ............. H02K 21/14
310/162
(Continued)

FOREIGN PATENT DOCUMENTS

CN 101121414 A 2/2008
CN 102656432 A 9/2012
(Continued)

OTHER PUBLICATIONS

International Search Report dated Nov. 25, 2014 for International Patent Application No. PCT/JP2014/072169.
(Continued)

Primary Examiner — Jermele M Hollington
Assistant Examiner — Temilade Rhodes-Vivour
(74) Attorney, Agent, or Firm — Karceski IP Law, PLLC

(57) ABSTRACT

A rotation-detecting apparatus includes the following: a rotor coil provided on a rotor; detection coils provided on stators; a control circuit that detects the relative rotational angle between the rotor and the stators by processing detection signals induced in the detection coils as a result of the rotor coil being excited by an excitation signal; and a communicating means for performing data communication with an external device. The control circuit in the rotation-detecting apparatus has functionality whereby a switch signal that turns on and off at preset rotational angles is outputted on the basis of the aforementioned detection signals. Also, the control circuit is designed such that the set rotational angles for the aforementioned switch signal can be changed by the external device via the abovementioned communicating means.

8 Claims, 15 Drawing Sheets

(51) Int. Cl.
  *H02K 11/33* (2016.01)
  *H02K 29/12* (2006.01)
  *G01D 5/20* (2006.01)
  *B60K 1/00* (2006.01)
  *B60L 1/00* (2006.01)
  *H02K 37/04* (2006.01)

(52) U.S. Cl.
  CPC ............... *H02K 29/12* (2013.01); *B60K 1/00* (2013.01); *B60L 1/00* (2013.01); *H02K 37/04* (2013.01); *H02K 2201/00* (2013.01)

(56) References Cited

U.S. PATENT DOCUMENTS

| | | | |
|---|---|---|---|
| 2008/0035411 A1* | 2/2008 | Yamashita | B62D 5/046 180/443 |
| 2011/0062905 A1 | 3/2011 | Sakai | |
| 2013/0249452 A1* | 9/2013 | Shinohara | G01D 5/2073 318/400.04 |
| 2013/0261886 A1* | 10/2013 | Aoki | B62D 5/0484 701/34.4 |

FOREIGN PATENT DOCUMENTS

| | | |
|---|---|---|
| EP | 2295309 | 3/2011 |
| JP | S59160201 A | 9/1984 |
| JP | H026602 A | 3/1990 |
| JP | H026602 A | 3/1990 |
| JP | H0740205 A | 2/1995 |
| JP | 2003315182 A | 11/2003 |
| JP | 2007076672 A | 3/2007 |
| JP | 3960120 B2 | 8/2007 |
| JP | 2007285759 A | 11/2007 |
| JP | 2008032561 A | 2/2008 |
| JP | 2010197217 A | 9/2010 |
| JP | 4946144 B2 | 6/2012 |
| JP | 2013083485 A | 5/2013 |
| JP | 5201589 B2 | 6/2013 |
| KR | 20040026533 A | 3/2004 |

OTHER PUBLICATIONS

Korean Office Action dated Feb. 22, 2018 for Korean Patent Application No. 10-2017-7002779.
Japanese Office Action dated Apr. 10 2018, for Japanese Patent Application No. 2016-545106.
European Office Action dated Mar. 16, 2018, for European Patent Application No. 14900949.0.
Chinese Office Action dated Jul. 19, 2018, for Chinese Patent Application No. 201480081383.8.
Japanese Office Action dated Oct. 30, 2018, for Japanese Patent Application No. 2016-545106.

* cited by examiner

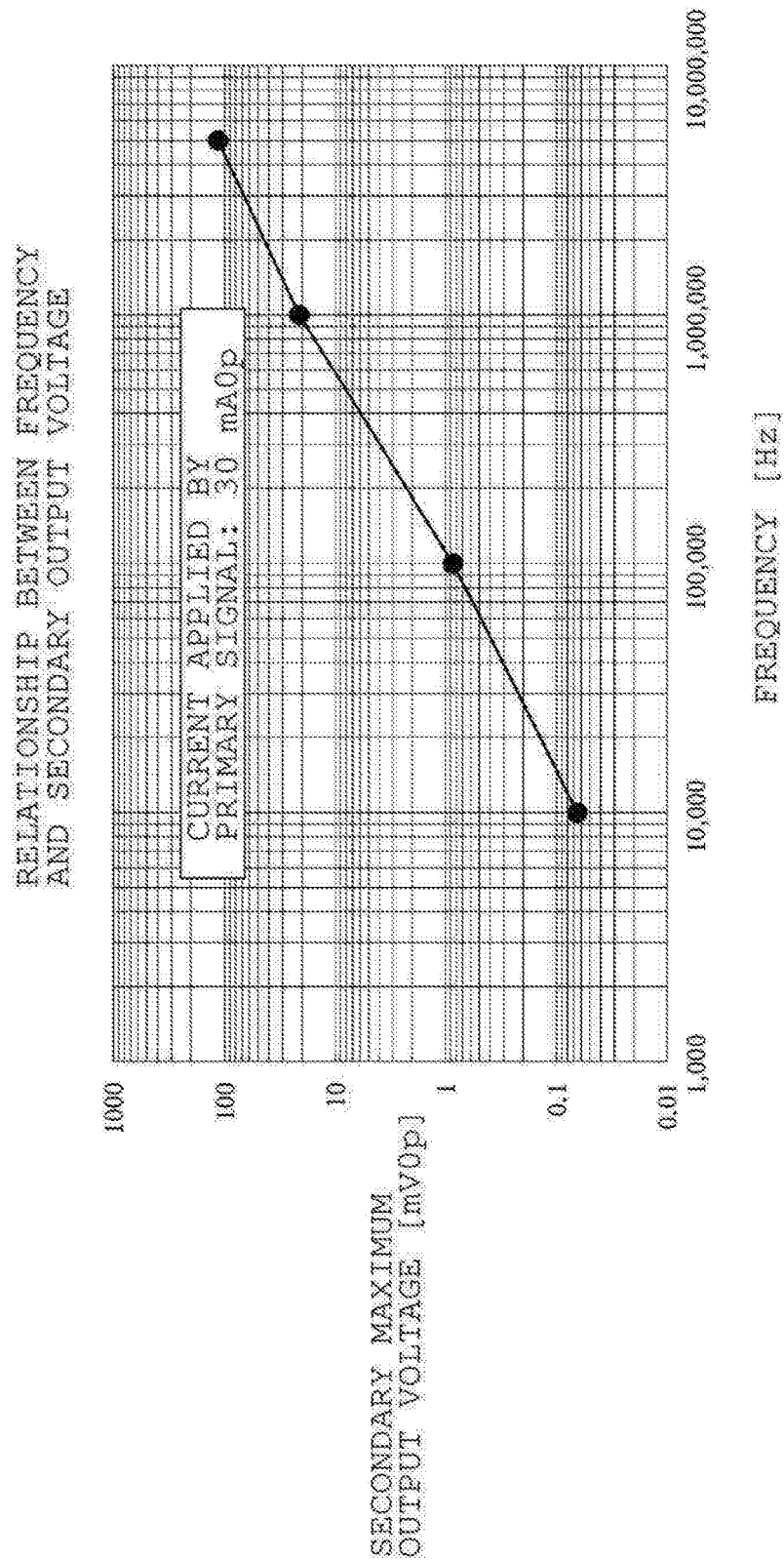

ROTATION-DETECTING APPARATUS

CROSS-REFERENCE TO RELATED APPLICATION(S)

This is a National Stage Entry into the United States Patent and Trademark Office from International PCT Patent Application No. PCT/JP2014/072169, having an international filing date of Aug. 25, 2014, the entire contents of which is incorporated herein by reference.

FIELD OF THE INVENTION

The present invention relates to a rotation-detecting apparatus capable of detecting the relative angle of rotation between a rotor and a stator.

BACKGROUND OF THE INVENTION

In related art, a mechanical cam has been used in manufacturing facilities in many fields. The mechanical cam is so configured that a disk-shaped cam is directly connected to a rotating body under measurement and a contact piece that is in contact with the cam provides a predetermined timing signal (switch signal) that follows the shape of the cam. The mechanical cam, however, is prone to wear of the cam and positional shift thereof, and cumbersome work, such as cam reproduction processing and position adjustment, is therefore required.

On the other hand, for example, Japanese Patent Laid-Open Patent Application No. 2007-76672 employs an electronic method, so to speak, using a resolver and a variable cam switch attached to the rotating shaft to provide the switch signal described above. That is, the resolver outputs predetermined reference voltage to the variable cam switch, and the variable cam switch outputs a switch signal according to the angle of rotation (rotational position) of the rotating shaft to a control apparatus (control panel) that serves as a high-level apparatus.

SUMMARY OF THE INVENTION

The method using the resolver and the variable cam switch, however, also requires a space for accommodating the resolver and the variable cam switch and causes the number of parts to be increased and the cost associated with the accommodation work to be added. In this regard, it is conceivable to carry out the process of generating the switch signal in the high-level apparatus without using the variable cam switch or other components. In this case, however, it is conceivable that some systems cause a problem if the switch signal is not produced when means for communication (such as network) with the rotation-detecting apparatus malfunctions or the high-level apparatus fails.

The present invention has been made in view of the circumstances described above, and an object of the present invention is to provide a rotation-detecting apparatus capable of not only reducing the overall size of the rotation-detecting apparatus but also enhancing reliability.

A rotation-detecting apparatus includes a rotor and stators, a rotor coil disposed in the rotor, detection coils disposed in each of the stators, a control circuit that processes detection signals induced in the detection coils when the rotor coil is excited with an excitation signal to detect a relative angle of rotation between the rotor and the stators, and communication means for data communication with an external apparatus, wherein the control circuit has a function of outputting a switch signal that turns on and off at a preset angle of rotation based on the detection signals and is configured to allow the external apparatus to change a setting of the angle of rotation associated with the switch signal via the communication means.

In the invention, since the rotation-detecting apparatus can detect the relative angle of rotation between the rotor and the stators on the basis of the detection signals induced in the detection coils, unlike with a mechanical cam, the problems such as wear of the cam and positional shift can be solved. Further, since the rotation-detecting apparatus incorporates the control circuit and outputs the switch signal described above, the overall size of the rotation-detecting apparatus can be reduced. Moreover, not only can the switch signal be outputted independently of the external apparatus, but also the external apparatus is allowed to change the setting of the angle of rotation associated with the switch signal.

BRIEF DESCRIPTION OF THE DRAWINGS

FIG. 8 shows the relationship between the frequency of an excitation signal and a detection signal (output voltage) in the rotation-detecting apparatus.

DESCRIPTION OF EMBODIMENT(S) OF THE INVENTION

Figure 1:
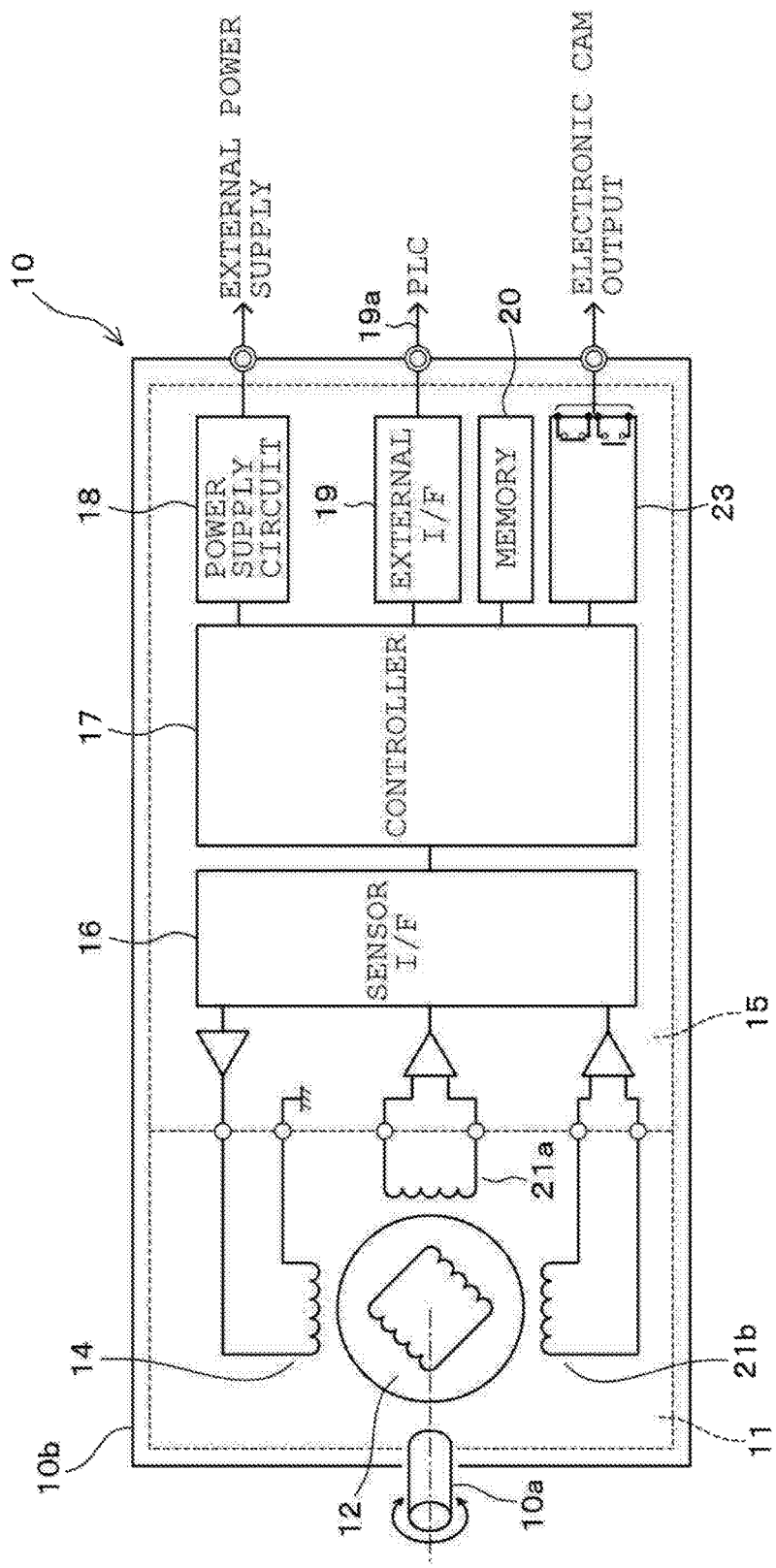
FIG. 1 shows an embodiment and is a block diagram showing the electrical configuration of a rotation-detecting apparatus.

An embodiment of a rotation-detecting apparatus 10 according to the present disclosure that is used in an FA (factory automation) field network will be described below with reference to the drawings. In the block diagram of FIG. 1, an outer shell case 10b and a rotating shaft 10a of the rotation-detecting apparatus 10 are diagrammatically shown for ease of description. The rotation-detecting apparatus 10 includes a stator provided in the outer shell case 10b and a rotor provided as part of a shaft 10a, which is a sensor shaft, and the stator and the rotor are formed of a stator substrate 11 having detection coils 21a and 21b, which will be described later, and a rotor substrate 12 having a rotor coil 22, as shown in FIG. 1.

The stator substrate 11 is further provided with an excitation coil 14. For example, when a single-phase AC signal is inputted as a predetermined excitation signal to the excitation coil 14, the rotor coil 22 is excited. When the rotor coil 22 is excited, a sine-wave phase output signal and a cosine-wave phase output signal having undergone amplitude modulation in accordance with the rotation of the shaft 10a are induced in the detection coils 21a and 21b. The sine wave sin θ and the cosine wave cos θ are used to determine tan θ, which is then used to determine arctangent to carry out the process of computing an angle of rotation θ of the shaft 10a. As described above, the rotation-detecting apparatus 10 according to the present embodiment is based on single-phase-excitation/dual-phase-output amplitude modulation by way of example. It is noted that dual-phase-excitation/single-phase-output, that is, inputting AC signals having the same amplitude but different phases to the excitation-side two phases allows the rotation-detecting apparatus 10 to be used in phase modulation in which the phase of an output signal changes in proportion to the angle of rotation θ.

In the rotation-detecting apparatus 10, the stator substrate 11 and the rotor substrate 12, which are described above and serve as a sensor section, and a detection circuit substrate 15, on which a control circuit that controls the stator substrate 11 and the rotor substrate 12 is mounted, are accommodated in the single case 10b, as shown in FIG. 1. A controller 17 is mounted on the detection circuit substrate 15 disposed in the case 10b. The controller 17 is a control circuit formed, for example, of a microcomputer, an FPGA (Field Programmable Gate Array), a DSP (Digital Signal Processor), and other components, controls the entire detector 10, carries out the computation process described above, and performs other types of operation.

Output signals from the detection coils 21a and 21b are inputted to the controller 17 described above via a sensor interface (I/F) 16. An internal power supply circuit 18, a network I/F 19, a memory section 20, and a contact output circuit 23 are connected to the controller 17. The internal power supply circuit 18 supplies each circuit in the rotation-detecting apparatus 10 with electric power supplied from an external power supply external to the rotation-detecting apparatus 10 with the electric power transformed and stabilized as required.

The network I/F 19 is communication means connected, for example, to a PLC (Programmable Logic Controller) as a high-level unit that is not shown via a control-system network. Specifically, in a case where the rotation-detecting apparatus 10 is used as one of a variety of measurement/control apparatus in in-factory manufacturing facilities, the signals processed by the controller 17 are transmitted from the network I/F (field bus I/F) 19 via a field bus 19a to the PLC described above. As described above, in the present embodiment, a variety of measurement/control apparatus, such as the rotation-detecting apparatus 10, are used as field apparatus, and the field bus 19a connects the filed apparatus to the high-level field apparatus (PLC, for example) via a single cable. The thus configured field network allows digitization of signals, common use of wiring, and other types of operation for reduction in the number of wiring lines and cost. The field network further allows the standards of the field apparatus to be made clear so that the connection and maintenance of the field apparatus can be readily performed and a variety of apparatus are allowed to operate on the field bus 19a. The field network can, for example, be general-purpose Ethernet (registered trademark) and may be configured as not only a closed network that is not supposed to be connected to another network but also a network in a broad sense (including closed networks connected to one another).

The field apparatus described above can be systemized without consideration of protocols and other factors by providing each of the field apparatus with a communication CPU that is, for example, a dedicated chip that is supplied from the manufacturer of the field apparatus and carries out a communication process over the field network. In this case, however, the dedicated chip increases the cost (price of the dedicated chip as a component is added), the chip occupies a large mounting space on the detection circuit substrate 15, and other problems arise. In the present embodiment, to allow the controller 17 to have the function of the dedicated chip, a process program stored in the memory section 20 is executed to carry out the process of communicating with the high-level field apparatus and other apparatus, a communication process relating to compatibility among application programs, and other processes. Instead, the hardware configuration of the FPGA (gate array) described above and other components or software configuration is used to omit the dedicated chip but achieve the function thereof. The rotation-detecting apparatus 10 can thus achieve reduction in the size and cost of the internal substrate 15. Further, integration of the sensor section described above with the detection circuit therefor in conjunction with use of the field network allows the entire footprint including the wiring described above to be minimized to construct a highly rational system.

The memory section 20 described above includes a nonvolatile memory, such as a ROM, a volatile memory, such as a RAM, and an electrically rewritable nonvolatile memory, such as an EEPROM. The memory section 20 stores the process program described above and other programs. The memory section 20 may also store in advance a correction value for improving rotational position/output value linearity. Further, as will be described later in detail, in the present embodiment, forming the rotor coil 22 in a waveform shape (see coils 221 to 224 and 221h to 224h in FIG. 3) allows improvement in the linearity without use of any correction value.

The number of contacts of the contact output circuit 23 described above is set as appropriate in accordance with the space required to mount the contact output circuit 23 and as required. The contact output circuit 23 has the function as an electronic cam that outputs a digitized signal representing, for example, ON and OFF and forms, along with the controller 17 described above, a control circuit. The electronic cam is configured to refer to the angle of rotation θ as absolute data to turn on and off a cam switch signal (output signal) corresponding to an angle set by a user. In this regard, in the case of a cam limit switch, which is formed of a mechanical cam, ON/OFF timing setting requires cumbersome work, such as adjustment of the positions of the components of the cam limit switch. On the other hand, in the case of an electronic cam, the setting can be more readily performed by the user's input operation. Specifically, data points (angles) relating to the ON/OFF timing are set, for example, by the high-level field apparatus or a dedicated apparatus (either of them is assumed to be an external apparatus) at the user's desired value via the field bus 19a (over network). For example, when angles of rotation θ of 0 degrees (first angle) and 90 degrees (second angle) in terms of mechanical angle are set by input operation performed on the external apparatus, the controller 17, when it determines that the angle of rotation θ of the shaft 10*a* is greater than or equal to 0 degrees but smaller than or equal to 90 degrees, turns on (or off) the output signal for the period for which the angle of rotation θ falls within the range from 0 degrees to 90 degrees. In a case where the set values remain unchanged, a simple state in which there is no connection to the network can be achieved, or default values that are the first and second angles can be stored in advance in the EEPROM or any other device in the memory section 20 and can be updated by changing the set default values. Further, an electronic cam is advantageous in terms of maintenance because wear or positional shift of the cam and other problems therewith do not occur, unlike a mechanical cam.

The cam switch signal does not need to respond at high speed depending on the application of the electronic cam, and the high-level field apparatus can process the signal. In this case, the high-level field apparatus reads the binary data via the field bus 19*a* and outputs the cam switch signal. However, for example, it is conceivable that some systems cause a problem if the cam switch signal is not produced when the network malfunctions or the high-level field apparatus fails. Further, in some applications of an electronic cam, a delay period from the point of time when the angle of the shaft 10*a* changes to the point of time when the cam switch signal is produced is required to be smaller than or equal to several dozen microseconds, that is, required to be responsive at high speed. In this case, turning on and off the output signal after the high-level field apparatus reads the data results in a long delay period and cannot therefore satisfy the requirement described above. It is therefore very significant to perform high-speed ON/OFF control independently, for example, of the network.

In this regard, the rotation-detecting apparatus 10 incorporates the sensor section, the controller 17, the contact output circuit 23, and other components and has a variety of functions including the function of an electronic cam. Further, the controller 17 can be formed not only of the FPGA but also of a dedicated gate array to allow electronic cam ON/OFF control. Further, as will be described later in detail, setting the excitation signal to oscillate at a high frequency ranging from 100 KHz to 5 MHz allows the data update period, that is, the delay period described above to be set, for example, at 10 μs or shorter, whereby the requirement of a high-speed response of the electronic cam can be satisfied. The contact output circuit 23 may be configured to have the function of a pulse encoder that will be described later.

Further, the contact output circuit 23 has a speed limit detection function of outputting a switch signal that turns on and off in accordance, for example, with a result of comparison between the angle of rotation θ described above (or the number of rotations, which will be described later) per predetermined period and a predetermined threshold. The speed limit detection function is the function of turning on or off the output signal when the rotational speed of the shaft 10*a* is greater than or equal to the predetermined threshold, which serves as a reference (speed limit guideline), and the function can be set in a variety of manners by the external apparatus described above.

In detail, the controller 17 computes the angle of rotation θ per the predetermined period, which is measured by using a clock signal generated by a quartz oscillator provided in the controller 17, that is, the rotational speed [rpm] of the shaft 10*a*. Further, as will be described later in detail, the controller 17 identifies the direction of the rotation of the shaft 10*a* by using the absolute data and generates a rotation direction identification signal. The memory section 20 stores clockwise (CW) and counterclockwise (CCW) default values set as the predetermined threshold. The predetermined threshold can be set at a plurality of different values desired by the user's input operation performed on the external apparatus described above irrespective of the direction of the rotation or in each of the directions of the rotation, and the thus changed predetermined threshold is stored in the memory section 20. Therefore, for example, in a case where the lower value and the higher value of the plurality of predetermined thresholds set for the clockwise (CW) rotational speed are called a first threshold and a second threshold, respectively, the controller 17 turns on (or off) the output signal when the computed rotational speed is determined to be greater than the first threshold in the clockwise (CW) rotational direction and turns off (or on) the output signal when the computed rotational speed is determined to be greater than the second threshold.

In contrast to the present embodiment, there is a speed switch that mechanically opens and closes the switch. For example, in a centrifugal-force-based speed switch, a movable portion that moves based on centrifugal force is accommodated in an enclosure that forms an outer shell of the switch, and the switch is configured to open and close an electric contact in accordance with a change in the position of the movable portion due to the rotation of the shaft of the movable portion. In this configuration, the rotational speed at the time when the electric contact opens or closes is determined in a physical sense, and the direction of the rotation of the shaft cannot be identified. Further, the centrifugal-force-based speed switch is not allowed to change the threshold in accordance with which the electric contact opens or closes or cannot have a plurality of thresholds. The mechanical movable portion causes unstable detection of the rotational speed and abnormal action due, for example, to wear, rust, and dust. Further, the enclosure of the speed switch requires a space for ensuring the movable range of the movable portion and stable action thereof, and it is therefore difficult to achieve size reduction.

In this regard, in the present embodiment, the controller 17 produces the absolute data, as described above, which allows, in conjunction with the quick response of the detection signal and the precise clock signal, the rotational speed to be calculated in an extremely simple, precise manner. Further, a plurality of thresholds of the rotational speed can be set by the external apparatus via the field bus 19*a* in each of the rotational directions. In a case where the set thresholds remain unchanged, the rotation-detecting apparatus 10 can be disconnected from the network. Therefore, even if communication malfunction occurs in the network, the speed limit detection function (contact output) of the rotation-detecting apparatus 10 normally operates, and no wear problem or no abnormal action problem occurs, unlike in related art, whereby a reliable system can be constructed.

Multilayer Substrate

The outer shell case 10*b* of the rotation-detecting apparatus 10 has, for example, a cylindrical shape, and the stator substrate 11 and the rotor substrate 12, each of which has, for example, a disc-like shape, are disposed in the case 10*b*. The stator substrate 11 is formed of a pair of stator substrates, which are attached to the outer shell case 10*b* at upper and lower two locations therein in FIG. 2. The pair of stator substrates 11 are formed of substrates having roughly the same configurations and disposed symmetrically on the upper and lower sides. Therefore, in the following description, the upper substrate has a reference character "11*u*", the lower substrate has a reference character "11d", and components of the substrates collectively have the same reference characters.

Each of the stator substrates 11u and 11d is formed of a general-purpose printed multilayer substrate formed, for example, of a first layer L1 to a third layer L3. Each of the stator substrates 11u and 11d has a through hole 110 provided in a central portion thereof and having a diameter larger than the diameter of the shaft 10a and is so disposed that the shaft 10a is inserted into the through hole. An insulating material of each of the stator substrates 11u and 11d is, for example, a four-layer glass-based epoxy resin. In the exploded view of the stator substrates 11u and 11d shown in FIG. 3, a coil pattern layer is provided in each of the first layer L1 and the second layer L2, and a wiring layer is provided in the third layer L3. Further, in each of the stator substrates 11u and 11d, the coil pattern layers are electrically connected to the wiring layer by what is called through hole drilling.

Specifically, in each of the stator substrates 11u and 11d, the coil pattern layer on the first layer L1 is formed by a planar copper-foil pattern and formed of an excitation coil 141 on the inner circumference side and detection coils 211a, 211b, 211ah, and 211bh on the outer circumference side. Among the coils, the detection coils 211a and 211b, which are inner-circumference-side coils, each correspond to a 1-pitch coil, which will be described later, and are coils for detecting the absolute position of the shaft 10a over 360 degrees in terms of mechanical angle (angle in a case where one rotation of the shaft 10a corresponds to 360 degrees). The detection coils 211ah and 211bh, which are outer-circumference-side coils, each correspond to a 16-pitch coil, which will be described later, and are coils for detecting the angle of rotation at high resolution.

Similarly, the coil pattern layer in the second layer L2 is formed of an excitation coil 142 on the inner circumference side and detection coils 212a, 212b, 212ah, and 212bh on the outer circumference side. An excitation coil 14 in each of the stator substrates 11u and 11d is formed of the patterned excitation coils 141 and 142, which form a plurality of layers. Detection coils 21a and 21b in each of the stator substrates 11u and 11d are formed of the patterned coils 211a to 212bh, which form a plurality of layers.

Figure 2:
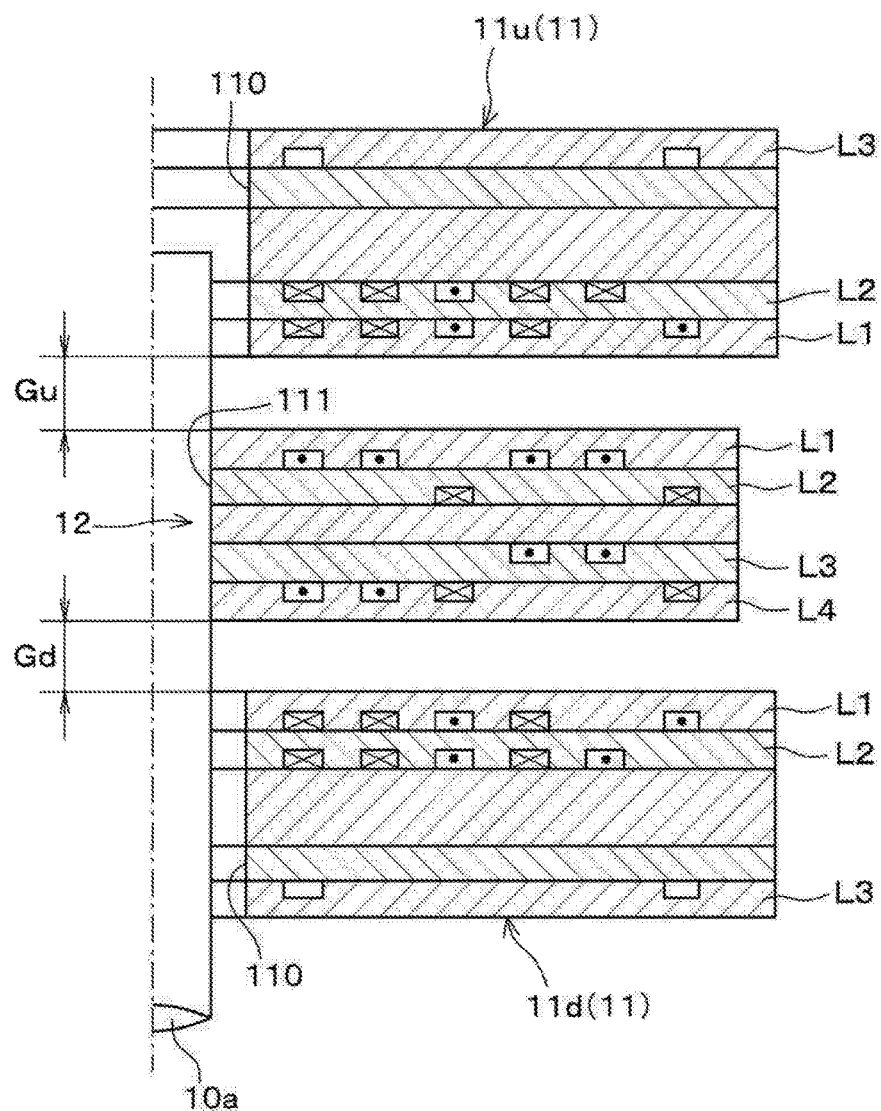
FIG. 2 is an enlarged longitudinal cross-sectional view showing a portion including a rotor substrate and stator substrates.
Figure 3:
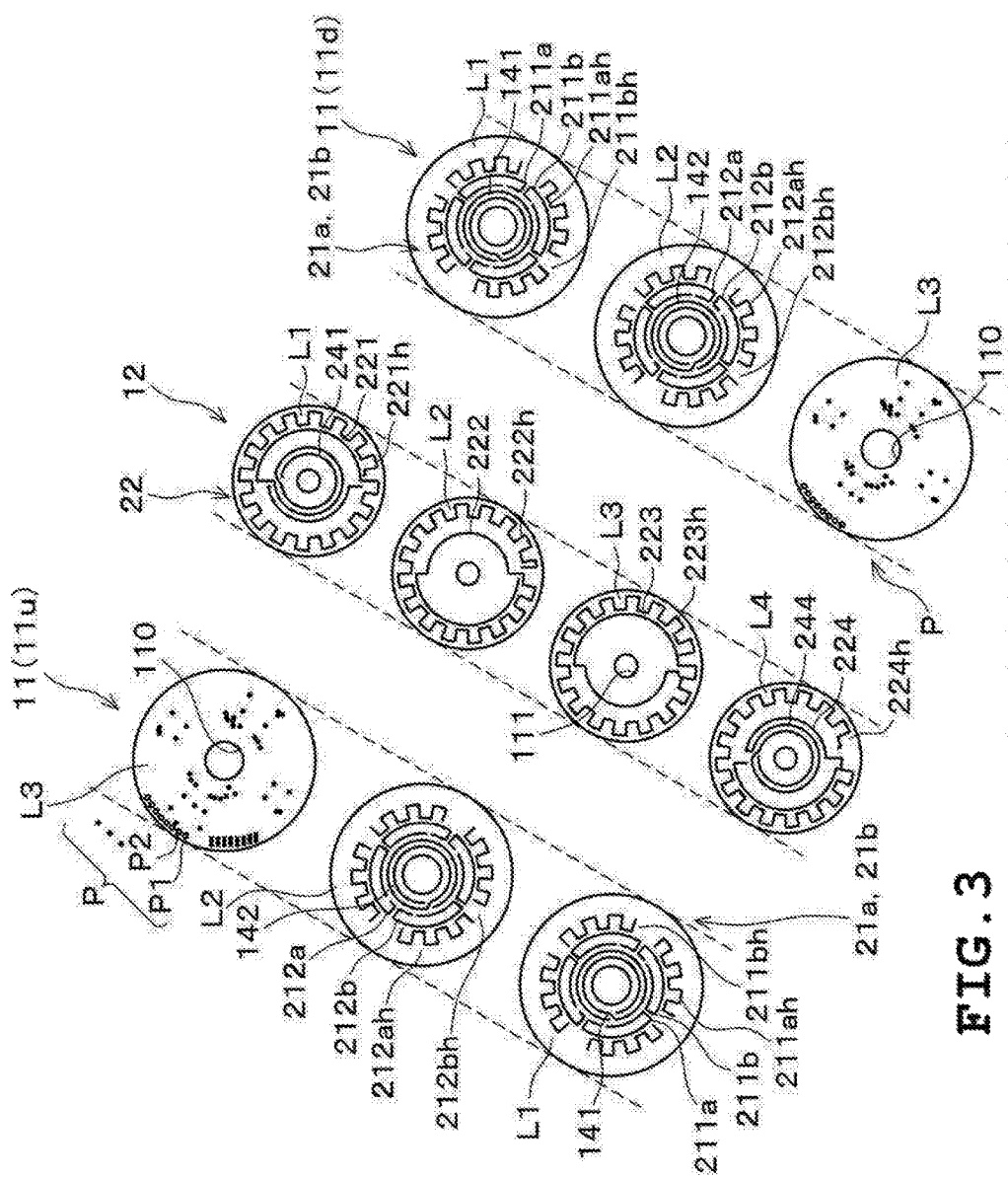
FIG. 3 is an exploded view of multilayer substrates that form the rotor substrate and the stator substrates.

The wiring layer in the third layer L3 is formed of pattern minute lines that link terminals p1, p2, . . . , that form a group terminal P shown in FIG. 3 to each other for wiring purposes. The stator substrates 11u and 11d face the rotor substrate 12 with gaps therebetween in such a way that the first layer L1 is located on the inner side and the terminal group P in the third layer L3 is located on the outer side with respect to the rotor substrate 12, as shown in FIG. 2. Each of the stator substrates 11u and 11d does not necessarily have the configuration described above, and the configuration described above may be changed as appropriate, for example, an electromagnetic wave shielding layer is provided between the second layer L2 and the third layer L3.

The rotor substrate 12 described above is formed of a general-purpose printed multilayer substrate formed, for example, of a first layer L1 to a fourth layer L4, and a glass-based epoxy resin is used as an insulating material. The rotor substrate 12 has a fitting hole 111 provided in a central portion, and the shaft 10a is fit into the fitting hole 111 so that the rotor substrate 12 is attached and fixed to the shaft 10a. Each of the first layer L1 to the fourth layer L4 of the rotor substrate 12 has a planar coil pattern layer formed of a copper foil and serving as the rotor coil 22.

Specifically, transformer coils 241 and 244, which correspond to the excitation coils 141 and 142 in the stator substrates 11u and 11d, are provided in the first layer L1 and the fourth layer L4 of the rotor substrate 12 and on the inner circumference side thereof, as shown in FIG. 3. An excitation signal (AC signal) is supplied from the excitation coils 141 and 142 in the stator substrates 11u and 11d to the transformer coils 241 and 244 in the rotor substrate 12 in a noncontact manner. The coils 141, 142, 221, and 224 form a rotary transformer.

Inner-circumference-side one-pitch coils 221, 222, 223, and 224, which are electrically connected to the transformer coils 241 and 244, and outer-circumference-side 16-pitch coils 221h, 222h, 223h, and 224h, which are also electrically connected to the transformer coils 241 and 244, are provided in the first layer L1 to the fourth layer L4 of the rotor substrate 12. The 1-pitch coils 221 to 224 and the 16-pitch coils 221h to 224h are formed in the positions corresponding to the detection coils 211a to 212b and 211ah to 212bh in the stator substrates 11u and 11d.

As described above, forming the stator and the rotor in the form of the multilayer substrates 11u, 11d, and 12 allows elimination of assembly of components to a magnetic material in related art, whereby the number of manufacturing steps can be reduced for cost reduction. Further, abrupt change in magnetic characteristics due to saturation of the magnetic material does not occur, and the amount of influence of bias due to an external magnetic field and temporal change therein can be reduced. Each of the multilayer substrates 11u, 11d, and 12 is lighter than a substrate made of a magnetic material so that the weight of the substrate can be greatly reduced, whereby load inertia can be minimized. In particular, in a case where the rotation-detecting apparatus 10 is used, for example, in a servo motor, the rotation-detecting apparatus 10 contributes to no useless load inertia in the view of the motor, whereby the rotation-detecting apparatus 10 is practically useful. Further, the multilayer substrates 11u, 11d, and 12 allow coil patterns having a variety of shapes to be readily produced with a small amount of manufacturing variation, unlike a winding using a magnet wire.

Pitch and Shape of Coil

Figure 4:
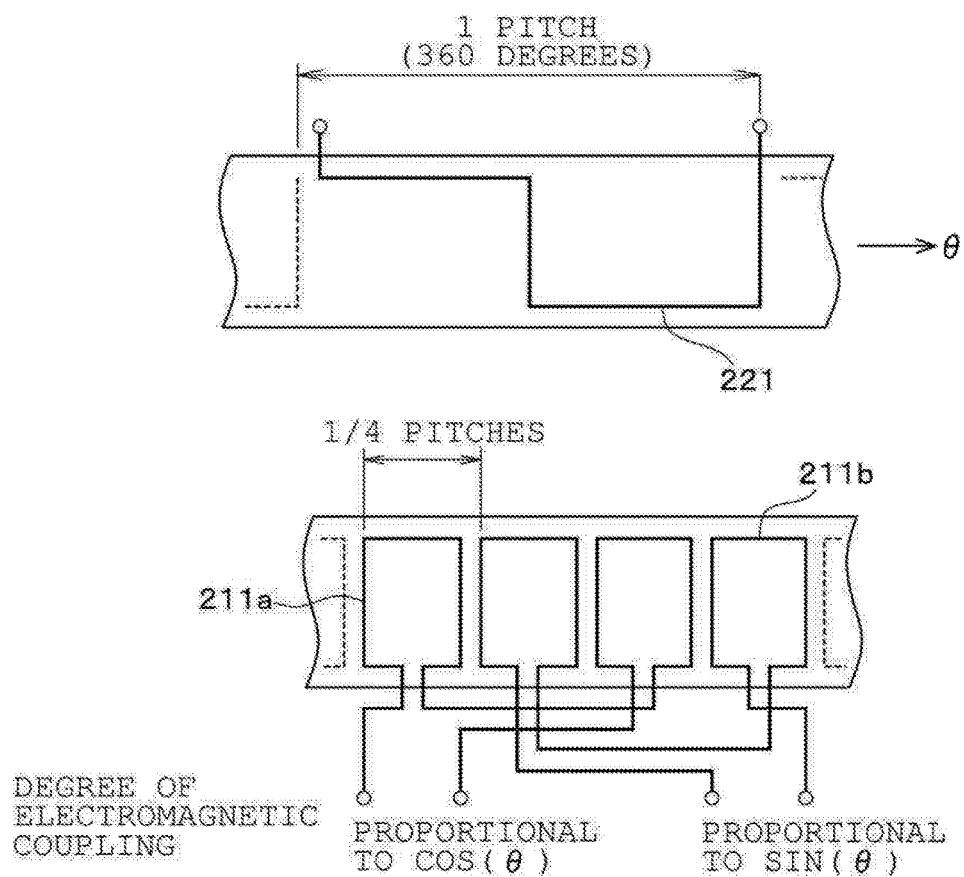
FIGS. 4(a) and 4(b) are conceptual views for describing the positional relationship between a rotor coil and a stator coil associated with a 1T sensor section.
Figure 5:
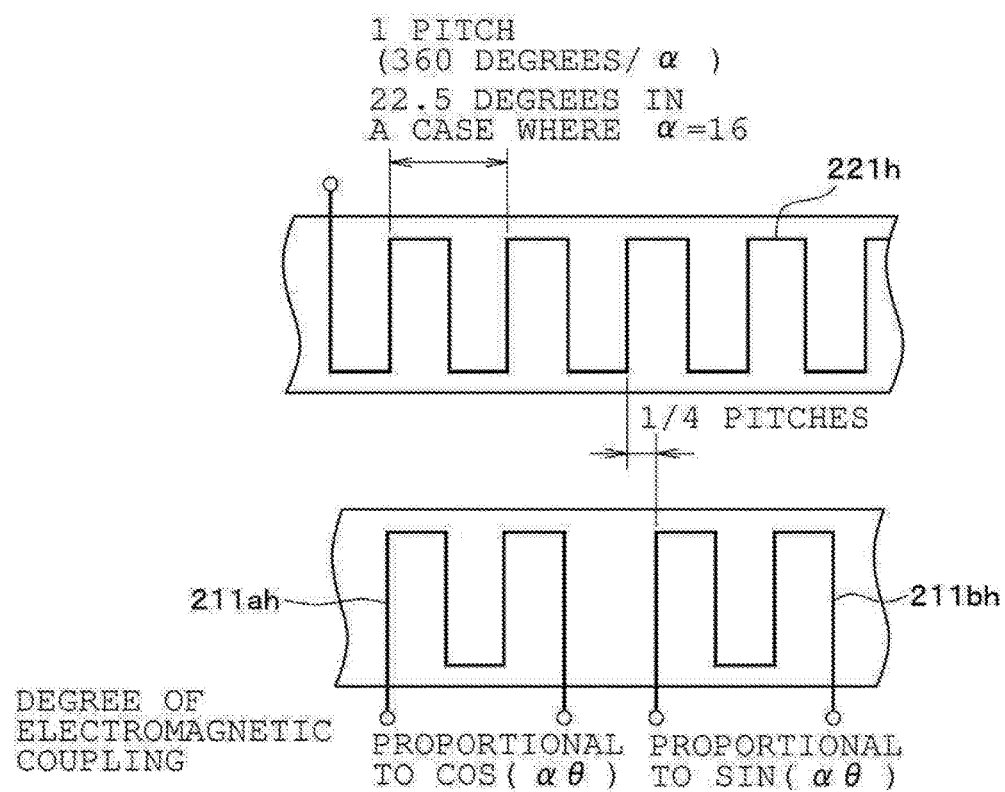
FIG. 5 is a diagram corresponding to FIG. 4 but shows the positional relationship in a 16T sensor section.

Each of the 1-pitch coils 221 to 224 and the 16-pitch coils 221h to 224h in the present embodiment has a sinusoidal shape. In FIGS. 3 to 5, the sinusoidal shape of each of the coils 221 to 224 and 221h to 224h is conceptually replaced with a rectangular waveform for ease of description. FIG. 4 schematically shows the positional relationship between the 1-pitch coil 221 and the detection coils 211a and 211b, and FIG. 5 schematically shows the positional relationship between the 16-pitch coil 221h and the detection coils 211ah and 211bh.

That is, the 1-pitch coil 221 shown in FIG. 4(a) actually has a sinusoidal shape that extends along an annular shape (extending in circumferential direction of rotor substrate 12) (see FIG. 3), and 1 pitch corresponds to 360 degrees (one rotation) in terms of mechanical angle. The pair of detection coils 211a and 211b shown in FIG. 4(b) are positioned so as to be shifted from each other by the ¼ pitches and provided in alternation. In FIGS. 4(a) and 4(b), each of the coils 221, 211a, and 211b actually arranged in an annular shape is shown in a developed form that extends in the rightward/leftward direction.

The electromagnetic coupling between the 1-pitch coil 221 and the detection coils 211a, 211b, that is, the voltage induced, is maximized in a position where the coil 221 overlaps with the coil 211a or 211b. The induced voltage gradually decreases as the rotor substrate 12 moves in the rotational direction thereof (see the rightward arrow in FIG. 4(*a*)) and becomes 0 in the position where the coils are shifted from each other by ¼ pitches so that the magnetic fluxes produced by the coils cancel each other. The induced voltage then has maximized but has a reverse polarity in the position where the coils are shifted from each other by ½ pitches, and when the rotor substrate 12 further rotates, the induced voltage becomes 0 again in the position where the coils are shifted from each other by ¾ pitch. Thereafter, in the position after the movement corresponding to 1 pitch, the maximum induced voltage is provided again. The thus changing induced voltage draws a 1-cycle line that completes in the cycle of rotation of the rotor substrate 12, which is equal to 1 pitch of the coil 221, and the cycle of the induced voltage repeats afterward in the same cycle as the rotor substrate 12 rotates.

In the detection coils 211*a* and 211*b* shown in FIG. 4(*b*), which are shifted from each other by ¼ pitches, are generated two types of induced voltage resulting from the electromagnetic coupling that changes and follows cosine and sine curves as the rotor substrate 12 rotates. The thus changing degree of electrical coupling in the detection coil 211*a* is proportional to $\cos \theta$, where $\theta$ is the difference in relative position (relative angle) between the rotor substrate 12 and the stator substrates 11, whereas the degree of electrical coupling in the detection coil 211*b* is proportional to $\sin \theta$. Therefore, since the change in the two types of induced voltage is unambiguously correlated to the relative angle between the 1-pitch coil 221 and the two coils 211*a*, 211*b*, the angle of rotation can be determined by detection of the voltage induced in each of the detection coils 211*a* and 211*b*.

The 16-pitch coil 221*h* shown in FIG. 5(*a*) also has a sinusoidal shape that actually extends along an annular shape (see FIG. 3), and FIG. 5(*a*) conceptually shows part of the coil 221*h*. The number of pitches $\alpha$ of 16-pitch coil 221*h* in the rotor substrate 12 is 16, that is, one pitch corresponds to the angle corresponding to 1/16 rotations (22.5 degrees) in terms of mechanical angle. The term "1 pitch" used herein corresponds to a segment where an absolute position is detected within the angular range of the "1 pitch". The number of pitches, which is the number of divided segments, is not limited to "16" and can be changed as appropriate, for example, can be set at "8" or "32".

One of the detection coils 211*ah* and 211*bh* shown in FIG. 5(*b*), in this case the coil 211*bh*, is shifted from the 16-pitch coil 221*h* by ¼ pitches. Further, since the detection coils 211*ah* and 211*bh* are shifted from each other by ¼ pitches, induced voltage proportional to $\cos(\alpha\theta)$ is sensed in the detection coil 211*ah*, and induced voltage proportional to $\sin(\alpha\theta)$ is sensed in the detection coil 211*bh*.

Conceptual View of Signal Processing

Figure 6:
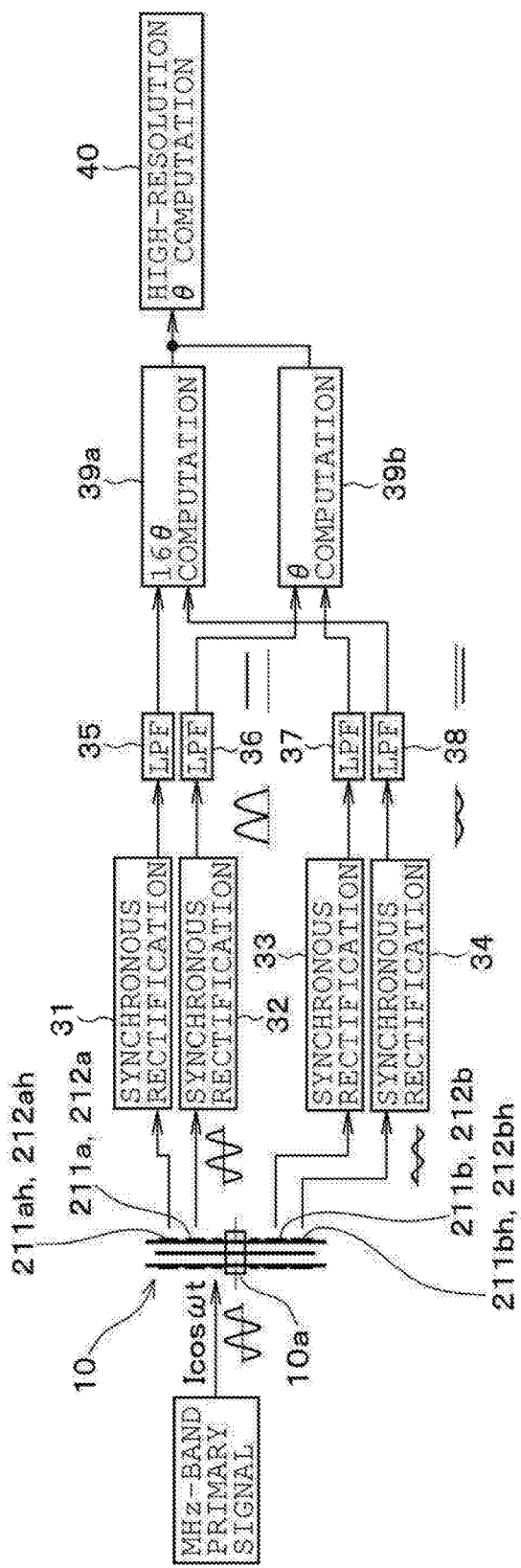
FIG. 6 is a block diagram associated with a computation process.

FIG. 6 is a conceptual view of signal processing in the controller 17 of the rotation-detecting apparatus 10 described above. Reference character $\theta$ denotes the angle of rotation of the rotor substrate 12, which rotates along with the shaft 10*a*, and $1 \cos \omega t$ in FIG. 6 denotes the excitation signal (MHz-band AC current that will be described later) supplied to the excitation coils 141 and 142. The 1-pitch coils 221 to 224 and the 16-pitch coils 221*h* to 224*h* are excited via the transformer coils 241 and 244 (rotary transformer). At this point, a sine-wave phase output signal and a cosine-wave phase output signal having undergone amplitude modulation in accordance with the rotation of the shaft 10*a* are induced in the detection coils 21*a* and 21*b*.

An output signal ($Kp \cdot \cos \omega t \cdot \cos 16\theta$) from the detection coils 211*ah* and 212*ah* for the 16-pitch coils is inputted to a synchronous rectifier circuit 31 shown in FIG. 6. An output signal ($Kc \cdot \cos \omega t \cdot \cos \theta$) from the detection coils 211*a* and 212*a* for the 1-pitch coils is inputted to a synchronous rectifier circuit 32. An output signal ($Kc \cdot \cos \omega t \cdot \sin \theta$) from the detection coils 211*b* and 212*b* for the 1-pitch coils is inputted to a synchronous rectifier circuit 33. An output signal ($Kp \cdot \cos \omega t \cdot \sin 16\theta$) from the detection coils 211*bh* and 212*bh* for the 16-pitch coils is inputted to a synchronous rectifier circuit 34. The reference characters 1, Kp, and Kc are coefficients, and the following reference characters Lp and Lc are also coefficients.

The synchronous rectifier circuits 31 to 34 perform synchronous rectification of the respective output signals. Lowpass filters (LPFs) 35 to 38 remove high-frequency components from the respective output signals from the synchronous rectifier circuits 31 to 34. A computation circuit 39*a* then computes the angle of rotation $\theta$ on the basis of a signal inputted from the lowpass filter 35 ($Lp \cdot \cos 16\theta$) and a signal inputted from the low pass filter 38 ($Lp \cdot \sin 16\theta$). A computation circuit 39*b* computes the angle of rotation $\theta$ on the basis of a signal inputted from the lowpass filter 36 ($Lc \cdot \cos \theta$) and a signal inputted from the low pass filter 37 ($Lc \cdot \sin \theta$). A computation circuit 40 then combines the values calculated by the computation circuits 39*a* and 39*b* with each other to detect the angle of rotation $\theta$ of the shaft 10*a* as the absolute data that will be described below and provides the angle $\theta$ at higher resolution.

1T Sensor Section and 16T Sensor Section

Figure 7:
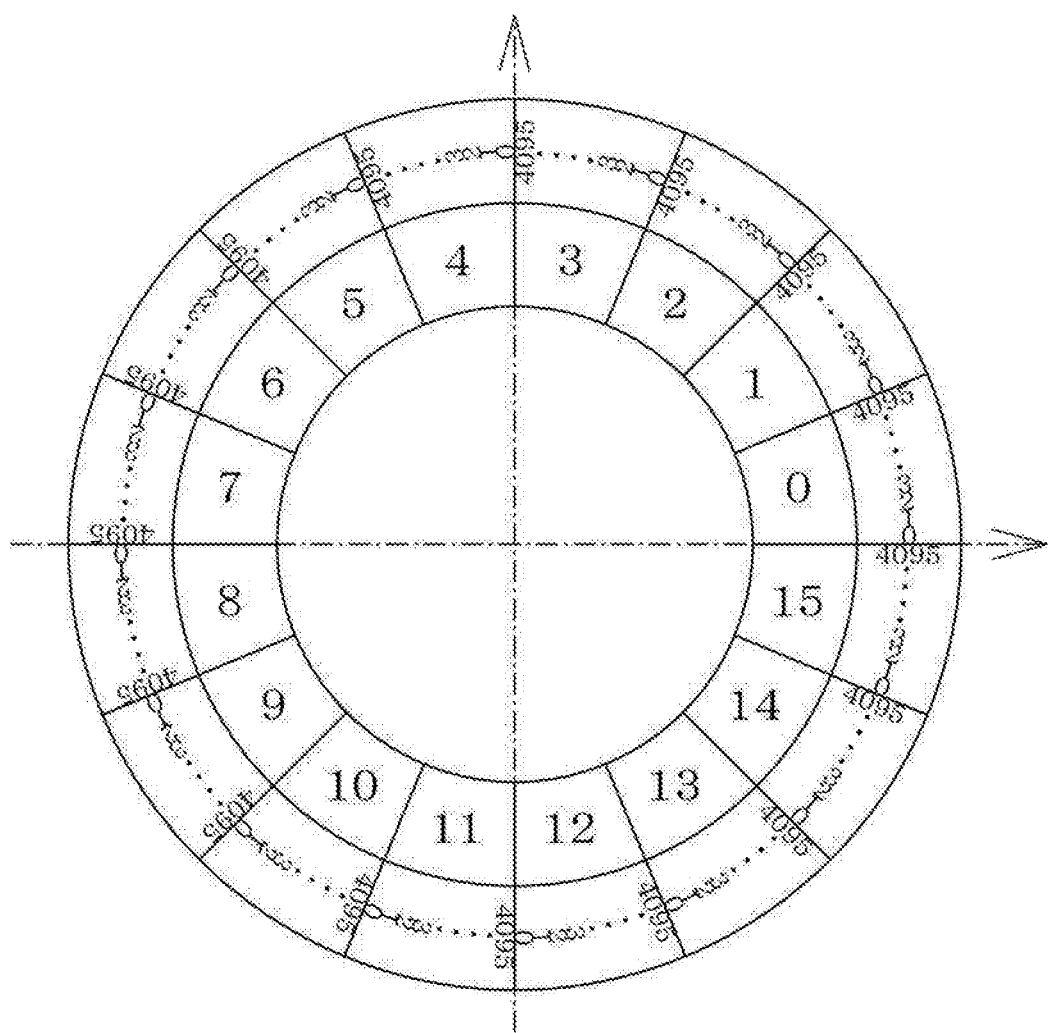
FIG. 7 is a conceptual view for describing digital position signals from the 1T sensor section and the 16T sensor section.

The angle of rotation $\theta$ described above is given in the form of a 4-bit digital position signal in association with the 1-pitch coils 221 to 224 and in the form of a 16-bit digital position signal in association with the 16-pitch coils 221*h* to 224*h*. FIG. 7 shows values of the digital position signal associated with the 1-pitch coils 221 to 224 and the detection coils 211*a* to 212*b* (hereinafter referred to as 1T sensor section) and the digital position signal associated with the 16-pitch coils 221*h* to 224*h* and the detection coils 211*ah* to 212*bh* (hereinafter referred to as 16T sensor section).

As shown in the same figure, when the shaft 10*a* rotates by 360 degrees in terms of mechanical angle, the 1T sensor section provides a digital value ranging from "0" to "15", and the 16T sensor section provides a digital value that repeatedly increments from "0" to "4095" 16 times. The 1T sensor section and the 16T sensor section have roughly the same nonlinearity of the outputs signals therefrom over one pitch, that is, roughly the same ratio of linearity error associated with the angle of rotation. Therefore, in the view of the mechanical angle of the shaft 10*a*, the 16T sensor section can reduce the degree of error by a factor of 16 as compared with the degree of error in the 1T sensor section, which is preferable from the viewpoint of error characteristics. Similarly, the 16T sensor section is more preferable also in terms of resolution (the number of divided segments described above), temperature characteristics, and noise resistance characteristics.

As described above, the 16T sensor section, which has relatively finer pitch, is effective as means for improving the sensor characteristics, but the range over which the angle of rotation can be detected as an absolute value, that is, the 1-pitch mechanical angle is limited to 22.5 degrees. The 16T sensor section cannot therefore detect the rotational position of the shaft 10*a* over 360-degree mechanical angle or cannot identify one out of the 16 blocks shown in FIG. 7. On the other hand, the 1T sensor section is inferior to the 16T sensor in terms of a variety of characteristics but has 1 pitch corresponding to 360 degrees in terms of mechanical angle and can therefore detect the rotational position of the shaft 10a over one rotation. Therefore, the positional signal from the 1T sensor section is used to identify the block position, which is unknown by the 16T sensor section. As described above, in the case of the data configuration shown in FIG. 7, the rotation-detecting apparatus 10 detects, as a one-rotation absolute sensor, a change in rotation of 360 degrees/(4096×16) in terms of mechanical angle.

The 1T sensor section and the 16T sensor section are therefore used to perform simultaneous detection to allow absolute sensing of one rotation of the shaft 10a with high precision and by using a large number of divided segments. The 16T sensor section may instead have an 8T pitch (⅛ division) or a 32T pitch (1/32 division). The number of divided segments is set in accordance with the physical coil arrangement space and the number of bits based on which the 1T sensor section identifies the rotational position. Further, the sensor sections are not necessarily the two sensor sections, 1T and 16T, and a multilayer substrate that incorporates three sensor sections, for example, 1T, 8T, and 64T, or four or more sensor sections may be used for higher performance. The multilayer substrates 11u, 11d, and 12 described above allow high design flexibility including coil formation and simple, easy implementation of a plurality of various coils (sensor sections), whereby an inexpensive configuration is achieved.

Frequency of Excitation Signal

In a rotation sensor, such as an inductosyn (product name), to increase the inductance and the degree of magnetic coupling of a sensor coil, the stator and the rotor are typically made of a metal material, such as iron, as the magnetic material. The frequency of the excitation signal in such a rotation sensor is set at a value ranging from about several hundred Hz to 10 KHz. The reason for this is as follows:

(1) Since the inductance is sufficiently high, even a relatively-low-frequency excitation signal can provide an adequate detection signal.

(2) Unlike the present embodiment, a rotation sensor is separate from a detection circuit (control apparatus) therefor. Therefore, since the rotation sensor and the control apparatus are separate from each other by a separation distance (length of cable that connects them to each other), the frequency is set at a low value so that the inter-line capacity does not affect the detection signal. Further, inter-line crosstalk degrades the sensor linearity, and the degree of influence of the crosstalk on the sensor linearity changes with the length of the cable.

(3) Since the inductance is high, as described in [1], a high-frequency excitation signal is affected by resonance, which increases an error.

(4) An iron steel plate or silicon-containing steel plate used as the magnetic material does not provide very good high-frequency characteristics.

(5) Even in a case where a rotation sensor is used in a servo system, an excitation signal having a frequency of about 20 KHz practically suffices.

(6) In an analog system, intended characteristics cannot be achieved in high-speed operation.

On the other hand, assume that no magnetic material is used, as in the present embodiment, and that a multilayer substrate including coils is accommodated in the case 10b, for example, having a diameter of about 60 mm. In this case, the diameter of the multilayer substrate is about 50 mm, and the inductance value of the coils (sensor section) in the view of an excitation circuit is a very small, for example, a value ranging from several to 10 µH. Assuming now, for example, that the inductance is 10 µH and the frequency is 10 KHz, impedance Z1 is as follows:

$$Z1 = 2\pi f L = 2\pi \times 10 \times 10^3 \times 10 \times 10^{-6} \cong 0.63 [\Omega] \quad (1)$$

In this regard, output current of about 0.5 [A0-P] from a sensor drive circuit that excites the coils is not technically difficult to achieve as long as a strong buffer circuit is employed. However, such a circuit undesirably causes not only an increase in the number of parts, an increase in current consumption, and other problems but also another problem, such as a decrease in reliability due to heat generation. Further, providing a heatsink increases the footprint, which contradicts the technical idea of size reduction resulting from integration of the sensor section with the control apparatus, which is the technical idea of the present embodiment. In view of the facts described above, the output current from the sensor drive circuit is set at a value ranging from about 10 to 30 [mA0-P]. For example, when drive current of 30 [mA0-P] is applied to Z1 in Expression (1) ($\cong 0.63 \Omega$), voltage V1 across the sensor section is as follows:

$$V1 = Z1 \times 30 \cong 18.8 \ [mV_{0-P}] \quad (2)$$

It is noted that a DC resistance component is neglected in Expression (2).

Further, detection voltage V2 induced in a secondary detection circuit, that is, on the secondary side in the sensor section is believed to be approximately several percent of the voltage V1 described above. As described above, in the present embodiment, in which the degree of magnetic coupling cannot be increased, unlike a typical configuration in which a magnetic material is used, the ratio of the detection voltage V2 to the voltage V1 is taken into consideration. For example, when the ratio is 3%, the detection voltage V2 is as follows:

$$V2 = V1 \times 0.03 = 18.8 \times 0.03 \cong 0.56 \ [mV_{0-P}] \quad (3)$$

The result shows that when the sensor section is excited with an excitation signal having a frequency of 10 [KHz] and a drive current of 30 [mA0-P], the detection voltage is 0.56 [mV0 -P]. In this regard, although the detection voltage is amplified or otherwise processed and eventually inputted to an A/D converter, the input voltage typically needs to be about several volts.

The detection voltage therefore needs to be amplified by a factor of at least 3000 under this condition, and the gain needs to be increased accordingly, resulting in an increase in the number of parts. Further, unintended positive feedback is applied in some cases to an amplification circuit having a very high gain due to slight coupling between the signal input stage and the amplified signal output stage (electrostatic coupling, magnetic coupling, and common impedance), resulting in oscillation of the circuit. Above all, the detection voltage itself is small, so that noise from the amplification circuit itself and external noise undesirably tend to affect the detection signal.

Briefly consider now the noise from an amplifier. A first-stage operational amplifier that amplifies the detection voltage V2 needs to have a sufficiently wide bandwidth including the operation frequency so that no phase shift occurs in the 10 [KHz]-signal. In this regard, since the input-equivalent noise voltage density of a typical wideband operational amplifier is about 10 nV/(Hz)½, input section noise voltage Vn is as follows when the bandwidth described above is set at 1 [MHz]:

$$Vn = 10 \times 10^{-9} \times (1 \times 10^6)^{1/2} = 0.01 \ [mV_{0-P}] \quad (4)$$

Vn is about 2% of V2=0.56 [mV0-P] in Expression (3) and seemingly appears not to be a big problem. In a configuration for achieving higher detection precision, however, ultralow-input use condition, in which noise inputted to a first-stage operational amplifier affects the detection signal, is practically very problematic. Further, in addition to the external noise described above, noise from a power supply line in the circuit, switching noise from a DC/DC power supply, crosstalk from a logic signal, and other types of noise affect the signal.

As measures to be taken against the problems described above, it is conceivable to increase the magnitude of the excitation signal current, but this is not preferable from the reason described above. In view of the facts described above, in the present embodiment, the frequency of the excitation signal is increased. For example, when the frequency of the excitation signal is increased from the original 10 KHz by a factor of 10 to 100 KHz, Z1, V1, and V2 described above are as follows:

$$Z1=2\pi fL=2\pi \times 100\times 10^3 \times 10\times 10^{-6} \cong 6.3[\Omega] \quad (5)$$

$$V1=Z1\times 30 \cong 188 \text{ [mV}_{0-P}] \quad (6)$$

$$V2=188\times 0.03 \cong 5.6 \text{ [mV}_{0-P}] \quad (7)$$

As described above, the detection voltage V2 is increased in proportion to the frequency of the excitation signal, and the noise resistance increases accordingly. Therefore, when the frequency of the excitation signal is further increased by a factor of another 10 to 1 MHz, the detection voltage V2 is also more preferably increased by a factor of another 10. Further, the problems [2] to [6] described above in the case where the frequency of the excitation signal is set at a large value can be solved as follows:

Problem [2]

Since the sensor sections and the detection circuit including the controller 17 are accommodated in the same case 10b, which is the case of the rotation-detecting apparatus 10 according to the present embodiment, the length of the cable between the rotor substrate 12 and the detection circuit substrate 15 can be minimized. The length of the cable in this case can be shortened to a minimized fixed length (shorter than or equal to 3 cm, for example). The inter-line capacitance of the cable therefore affects the detection signal only by a substantially negligible amount. In other words, it can be said that increasing the frequency of the excitation signal and arranging the sensor sections and the control device therefor close to each other are compatible with each other.

Problems [3] and [4]

The rotation-detecting apparatus 10 has low inductance because no magnetic material is used, and the frequency of the excitation signal is therefore set at a relatively large value. This is tied closely to the problem of degradation in high frequency characteristics of a stator and a rotor made of a magnetic material. By the way, it is known that the reason why a resonance state (self-resonance) occurs in a typical inductance part having excellent frequency characteristics, such as a commercially available choke coil, is that the impedance of the inductance part ranges from about one to several ten kilo-ohms. In this case, irrespective of the inductance value, resonance occurs at a frequency that causes the impedance to range from about one to several ten kilo-ohms. It is therefore believed that resonance occurs due to a physical limitation set by a coil and the inter-line capacity of the coil itself.

Resonance similarly occurs in the rotation-detecting apparatus 10 according to the present embodiment from the viewpoint of inductance, and to avoid influence of a current phase unsteady state due to the resonance phenomenon, the rotation-detecting apparatus 10 should be driven at a frequency sufficiently lower than the resonance frequency. It is therefore believed that the rotation-detecting apparatus 10 satisfactorily functions as a sensor without being affected by the resonance as long as the impedance value is smaller than or equal to a value ranging from about several ten kilo-ohms to several hundred ohms. The frequency is now back calculated from Z1 described above in a case where the limit of the impedance is set, for example, at 300Ω as follows:

$$f=Z1/2\pi L \cong 4.8 \text{ [MHz]} \quad (8)$$

That is, the frequency that allows the rotation-detecting apparatus 10 to satisfactorily function without being affected by the resonance is about 5 MHz in principle. It is noted that since the design of each of the coils in the sensor sections is flexible to some extent, the value described above is not altogether the absolute limit. Further, in a case where the impedance is too high, driving the rotation-detecting apparatus 10, for example, by current having the magnitude of 30 [mA0-P] undesirably causes too much increase in the voltage across the coil, and the rotation-detecting apparatus 10 cannot be driven in an intended manner. In this regard as well, it is reasonable to set the frequency of the excitation signal to fall within a range that allows the impedance of the coil to be lower than or equal to several hundred ohms.

Problem [5]

As described above, in the present embodiment, since the frequency of the excitation signal is set in a range greater than the range in related art, the response frequency associated with the rotational position detection can be improved. It can therefore be said that the configuration in the present embodiment is a preferable configuration.

Problem [6]

As semiconductor devices advance in recent years, an operational amplifier, which is important in the detection circuit in the present embodiment, having a band higher than 1 GHz and being compact and inexpensive is readily available. Further, an A/D converter, which is also important in the detection circuit, having a sampling rate higher than 100 MHz and being compact and inexpensive is readily available. Under these circumstances, in the rotation-detecting apparatus 10 using the parts described above, the present inventor has constructed a detection circuit that operates at an excitation signal frequency of 5 MHz.

FIG. 8 shows the relationship between the frequency of the excitation signal supplied to the excitation coils 141, 142 and the voltage V2 detected at the detection coils 211ah to 212bh (detection value in rotor position where voltage V2 is maximized). As shown in FIG. 8, when the frequency of the excitation signal is 10 KHz, 100 KHz, 1 MHz, and 5 MHz, the peak value [mV0-P] of the detection voltage V2 is about 0.06, 0.85, 21.2, and 115, respectively. It can therefore be verified that the detection voltage V2 increases roughly in proportion to the frequency of the excitation signal and increases to sufficiently large values at 1 MHz and 5 MHz. It is noted that the reason why such high frequencies have not been set in related art is believed to no necessity to set the frequency at a high value in the first place (current state at the past point of time sufficed) and no attempt to improve the detection voltage.

As described above, in the present embodiment, it is recommended that the frequency of the excitation signal be set at a high frequency higher than or equal to 100 KHz, preferably at a value ranging from 100 KHz to 5 MHz, more preferably at a value ranging from 1 MHz to 5 MHz. As a result, even the rotation-detecting apparatus 10 using no magnetic material is allowed to have synergistically enhanced sensor characteristics, an improved response frequency, and other advantageous effects that have not been achieved in related art.

Shape of Rotor Coil

When each of the coils 221 to 224h in the rotor substrate 12 has a sinusoidal shape, intended induced voltage can be achieved even when the pitches of the coils including the detection coils 211a to 211bh and the distances between the substrates 11u, 11d, and 12 are arbitrarily set. That is, in the multilayer substrates 11u, 11d, and 12, a precise, special coil pattern that cannot be achieved by using a wiring using a magnet wire as in related art can be formed in a pattern formation process.

In this regard, a typical inductosyn (product name) has a rectangular waveform coil, but in a case where the dimensional shape described above (case 10b having diameter of 60 mm) is applied to an inductosyn, it has been demonstrated that the linearity of output variation characteristic deteriorates. To avoid the situation, setting appropriate distances between the rotor substrate 12 and the stator substrates 11u, 11d (see Gu and Gd in FIG. 2), which will be described later, and designing a coil shape according to a coil configuration suitable for performance maintenance (1T and 16T sensor sections) allow improvement in the linearity without no increase in material cost or the number of manufacturing steps.

It is also possible to employ a configuration in which the memory section 20 described above stores detection errors for each of the 1T and 16T sensor sections and the angle of rotation θ is computed by using the detection errors as correction values. In this configuration, however, an increase in cost due to a correction process carried out for each of the sensor sections and other downsides are conceivable. Therefore, forming each of the coils 221 to 224h in a sinusoidal shape, as in the present embodiment, allows improvement in the linearity in a simple configuration with no correction of the angle of rotation θ. It is noted that even when each of the coils 221 to 224h is formed in a sinusoidal shape, an error correction process may be so carried out that the amount of error is reduced as much as possible.

Arrangement and "Shift" of Substrates

The present inventor has conducted an experiment in which the current configuration of the rotation-detecting apparatus 10 is compared with a configuration without one of the stator substrates or the stator substrate 11u (upper substrate 11u in FIG. 2) in order to verify the advantageous effects provided by the two stator substrates 11u and 11d, which sandwich the rotor substrate 12. In the following description, the former configuration is abbreviated to two-side stators 11u, 11d, and the latter configuration is abbreviated to one-side stator 11d. FIG. 9 shows a result of the experiment using the 1T sensor section in which 1 pitch corresponds to 360 degrees in terms of mechanical angle, and FIG. 10 shows a result of the experiment using the 16T sensor section in which 1 pitch corresponds to 22.5 degrees in terms of mechanical angle.

Figure 9A:
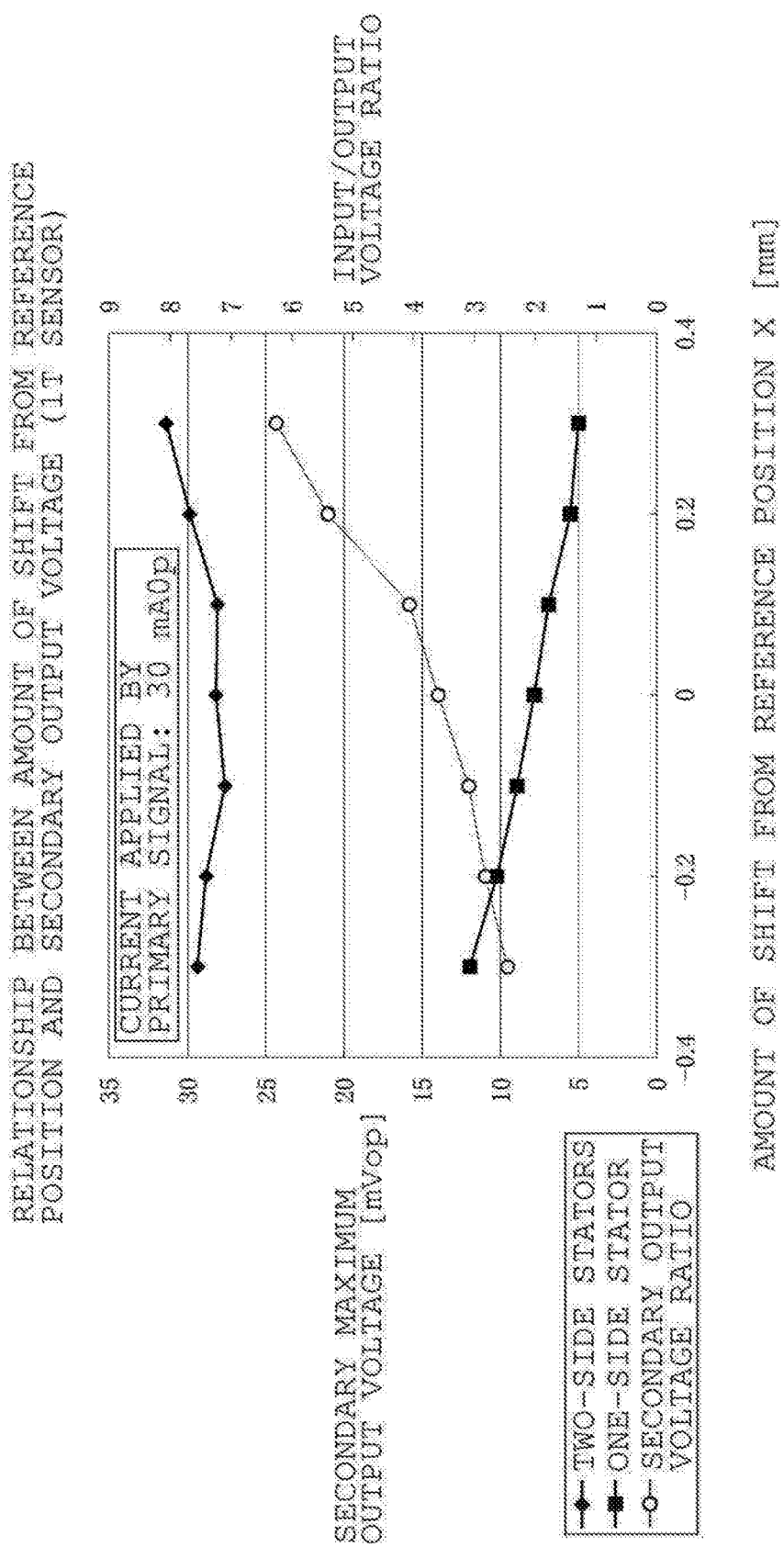
FIG. 9 describes the difference in characteristics between two-side stators and a one-side stator in the 1T sensor section, FIG. 9(a) showing the relationship between the amount of shift of the rotor substrate and the output voltage, and FIG. 9(b) showing the relationship between the amount of shift of the rotor substrate and a detection angle error.
Figure 9B:
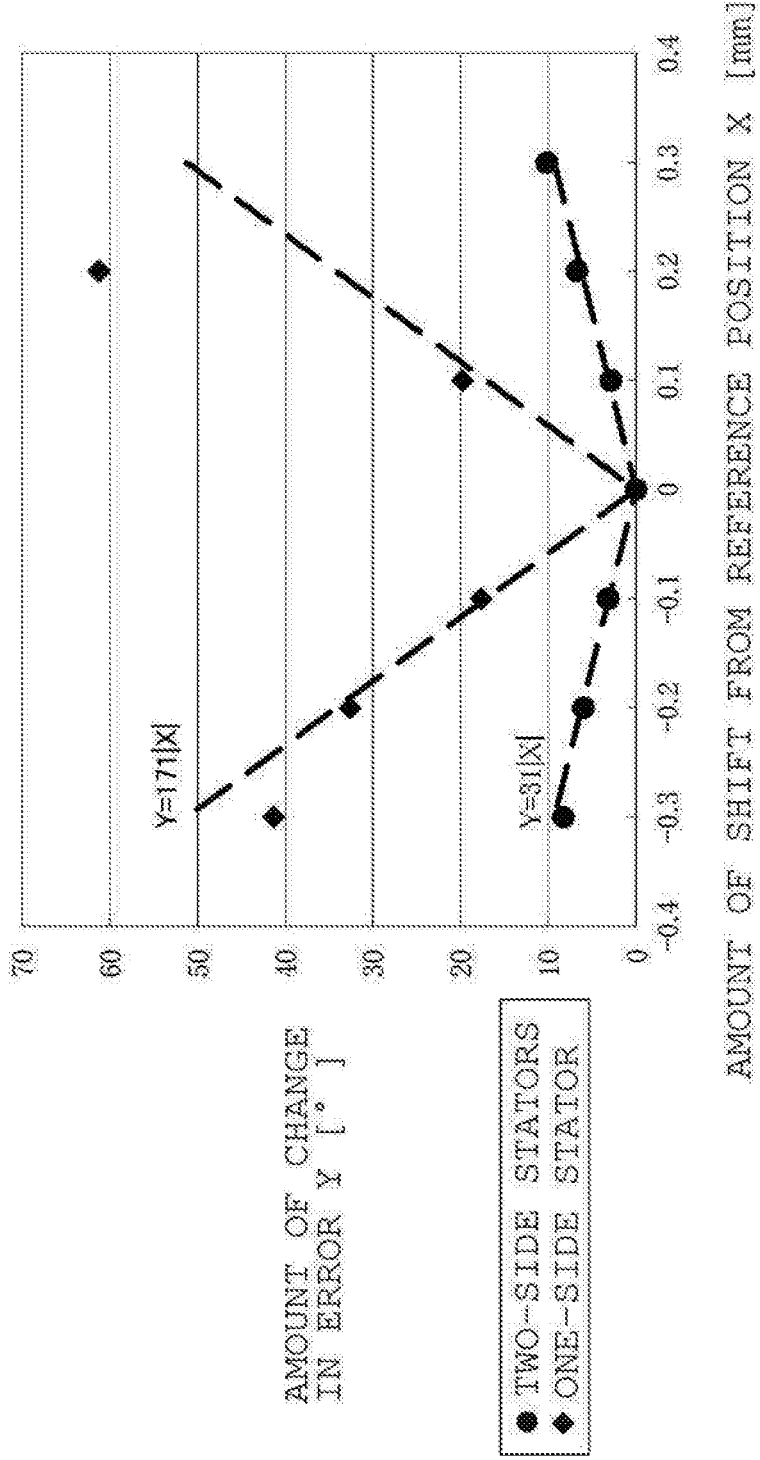
Figure 10A:
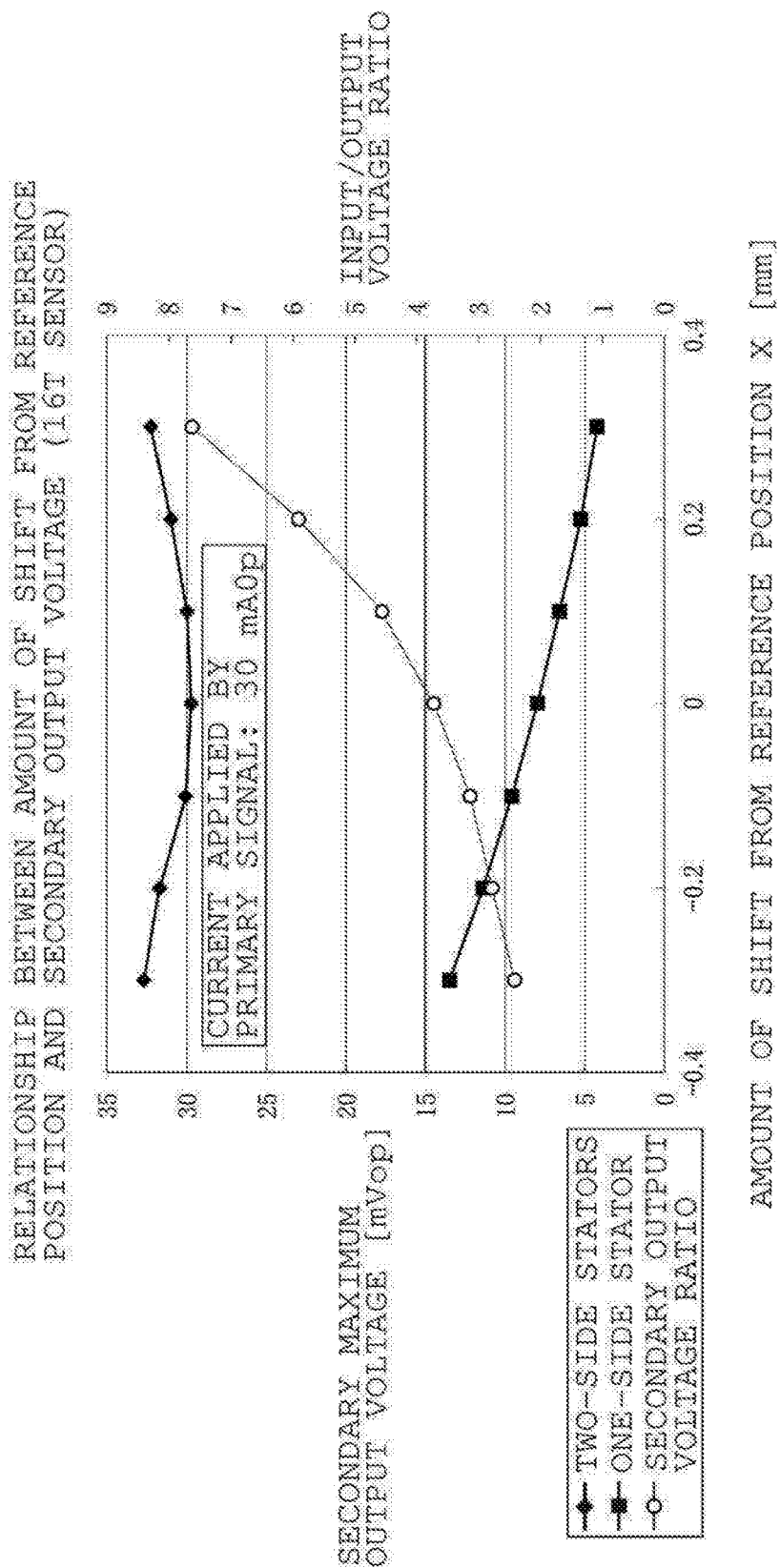
FIG. 10 corresponds to FIG. 9 and shows the 16T sensor section.
Figure 10B:
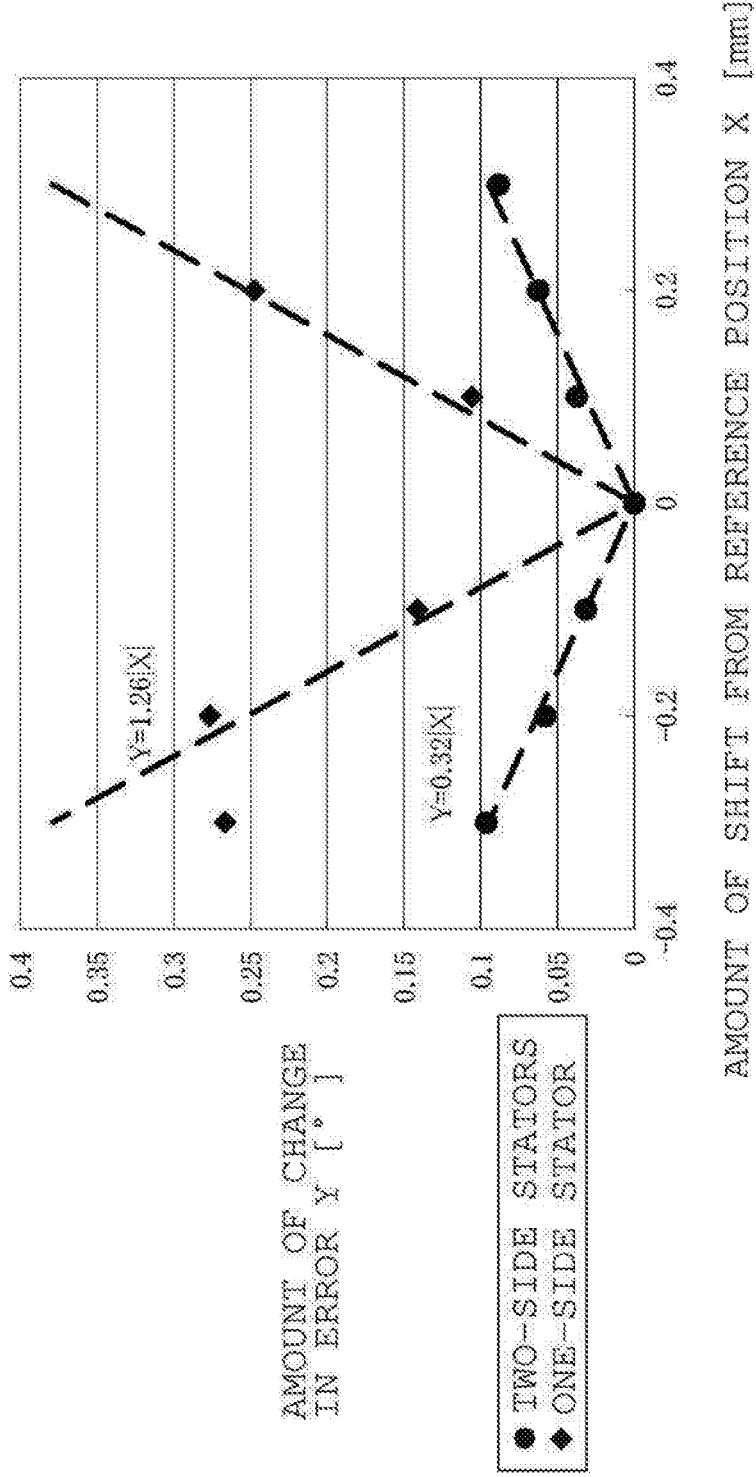

The distances Gu, Gd between counterposed surfaces of the two-side stators 11u, 11d and the rotor substrate 12 in FIG. 2 are each set at 0.35 mm, and the horizontal axis in FIGS. 9 and 10 represents the amount of axial shift of the rotor substrate 12 (upward in axial direction is assumed to be positive in FIG. 2). In FIGS. 9(a) and 10(a), current applied by a primary signal (excitation signal) associated with the 1T and 16T sensor sections is set at 30 [mA0-P], which is close to an actual value, and peak voltages [mV0-P] of a secondary signal (output voltage) V2 resulting from the primary signal are shown.

In the 1T sensor section shown in FIG. 9(a), the difference in the magnitude of the output voltage V2 between the two-side stators 11u, 11d and the one-side stator 11d is obvious, and the ratio between the voltage values from the two types of stator is about 3.6 in the case where the rotor substrate 12 is located in the original reference position (0 mm). Also in the 16T sensor section shown in FIG. 10(a), FIG. 10(a) show a large difference in the magnitude of the output voltage V2 between the two-side stators 11u, 11d and the one-side stator 11d, and the voltage ratio is about 3.7 in the case where the rotor substrate 12 is located in the reference position. Further, in each of the 1T and 16T sensor sections, the two-side stators 11u, 11d has a small amount of influence on the output voltage V2 even if the rotor substrate 12 is shifted from the reference position by ±0.3 mm, as shown in FIGS. 9(a) and 10(a). In contrast, the one-side stator 11d causes the output voltage V2 to decrease as the rotor substrate 12 moves away from the reference position. Therefore, a secondary output voltage ratio representing the ratio of the output voltage V2 provided by the two-side stators 11u, 11d to the output voltage V2 provided by the one-side stator 11d shows large differences between the two types of stator, that is, the ratio is 6.3 in the 1T sensor section (see FIG. 9(a)), and the ratio is 7.6 in the 16T sensor section (see FIG. 10(a)). As a result, it is found that the two-side stators 11u, 11d can provide output voltage V2 much greater than that provided by the one-side stator 11d, whereby decrease in the voltage can be suppressed and the performance can therefore be maintained even if the substrates 11u, 11d, and 12 are shifted from each other when they are assembled to each other or due to use over time.

Further, in the 1T sensor section, the amount of shift of the rotor substrate 12 from the reference position is roughly proportional to the detection error of the angle of rotation θ due to the shift, as shown in FIG. 9(b). In this case, the detection error that occurs in the two-side stators 11u, 11d is much smaller the detection error that occurs in the one-side stator 11d, that is, smaller than or equal to ⅕ thereof. Also in the 16T sensor section in FIG. 10(b), when the rotor substrate 12 is shifted from the reference position, the detection error that occurs in the two-side stators 11u, 11d falls within a range smaller than or equal to ¼ of the detection error that occurs in the one-side stator 11d. The result shows that even if the substrates 11u, 11d, and 12 are shifted from each other when they are assembled to each other or due to use over time, the two-side stators 11u, 11d allow the detection precision to be maintained with the detection error minimized, and it can be said that the two-side stators 11u, 11d is insensitive to the axial shift.

Phase of Excitation Current

In the rotation-detecting apparatus 10, consider the process of detecting the output signals induced in the detection coils 21a and 21b by driving the excitation coils 141 and 142 to excite the rotor coil 22 via the rotary transformer. In this case, the phase of the voltage that is the output signal from each of the detection coils 21a and 22b coincides with the phase of the current flowing through the excitation coils 141 and 142.

That is, first of all, since the input impedance of the detection circuit is designed to be sufficiently higher than the impedance of each of the detection coils 21a and 22b, the phase does not change at the input of the detection circuit. On the other hand, when the coils 141 and 142 on the excitation side are voltage driven, the "phase of current" flowing through each of the coils 141 and 142 is determined by the impedance of the coil. The impedance is the combination of the "resistance" component and the "inductance-induced reactance" component of each of the coils 141 and 142 (see FIG. 11(*b*)). In the case of the coils 141 and 142 in the multilayer substrates 11*u* and 11*d*, the resistance value is not so small that it is negligible relative to the inductance value. That is, the current flowing through each of the coils 141 and 142 does not have a waveform in which the phase is delayed by 90 degrees with respect to the phase of the drive voltage across the corresponding one of the coils 141 and 142, unlike in the case of an ideal inductor having negligible resistance component.

Unlike the present embodiment, in a system using a typical rotation-detecting apparatus, means for synchronously rectifying a detection signal by using an excitation signal as a reference signal is employed. In the synchronous rectification process, the relationship between the phase of the reference signal and the phase of the detection signal is also important information for detecting the angle of rotation θ, and in the case where the phase shift occurs as described above, it is conceivable that the problem described above is solved by offset of the phase of the reference signal by a necessary amount. In this case, however, when a change in the temperature around the sensor section changes the resistance component of the coil (see ΔR in FIG. 11(*b*)), the phase of the excitation current is shifted accordingly. The shifted phase directly results in a shift of the phase of the voltage in the detection circuit. As a result, a shift occurs in data on the angle of rotation θ.

Figure 11A:
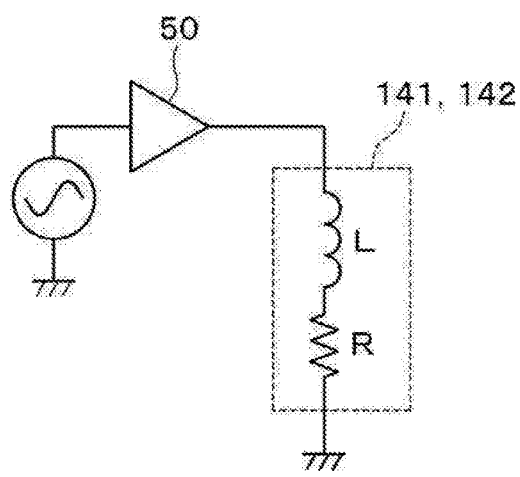
FIG. 11 describes a constant current drive method.
Figure 11B:
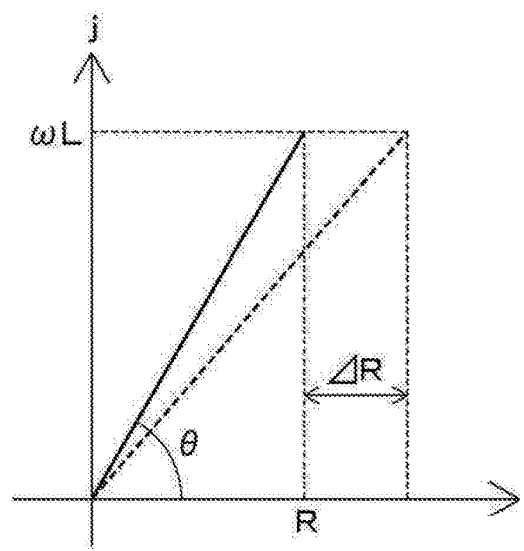

To avoid the situation described above, in the rotation-detecting apparatus 10 according to the present embodiment, the coils 141 and 142 on the excitation side are driven by a constant current drive circuit 50, which supplies the coils 141 and 142 with fixed drive current, as shown in FIG. 11(*a*). Therefore, even if a change in the temperature in the surroundings changes the resistance components of the coils 141 and 142, the change can be compensated by the constant current drive performed on the coils 141 and 142 (constant current control performed by controller 17), and the phase of the excitation current can be handled as a known value. The correction associated with a temperature change can also be achieved by constant voltage drive. The temperature correction can instead be made by using a counter that counts time until a zero-cross point is reached to detect the phase of the excitation current flowing through each of the excitation coils 141 and 142, whereas the constant current drive described above allows the detection precision to be improved in a simple configuration that does not require the detection circuit described above.

Pulse Encoder Function

The contact output circuit 23 in the rotation-detecting apparatus 10 can be equipped with, in addition to the electronic cam function and the speed limit detection function described above, the function as a pulse encoder by using the absolute data. A pulse encoder is a device that outputs phase-A, phase-B, and phase-Z pulse signals from the contact output circuit 23. Among the outputted pulse signals, the phase-Z signal is formed of pulses representing the reference position outputted whenever the encoder makes one rotation. In the following description, a method for producing the phase-A and phase-B pulses is briefly described.

Figure 12A:
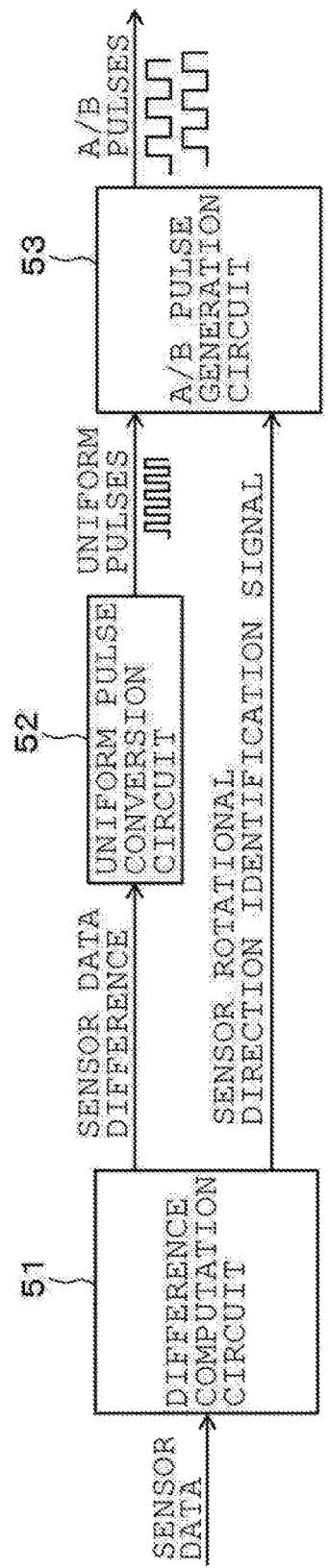
FIG. 12 describes a pulse encoder function.
Figure 12B:
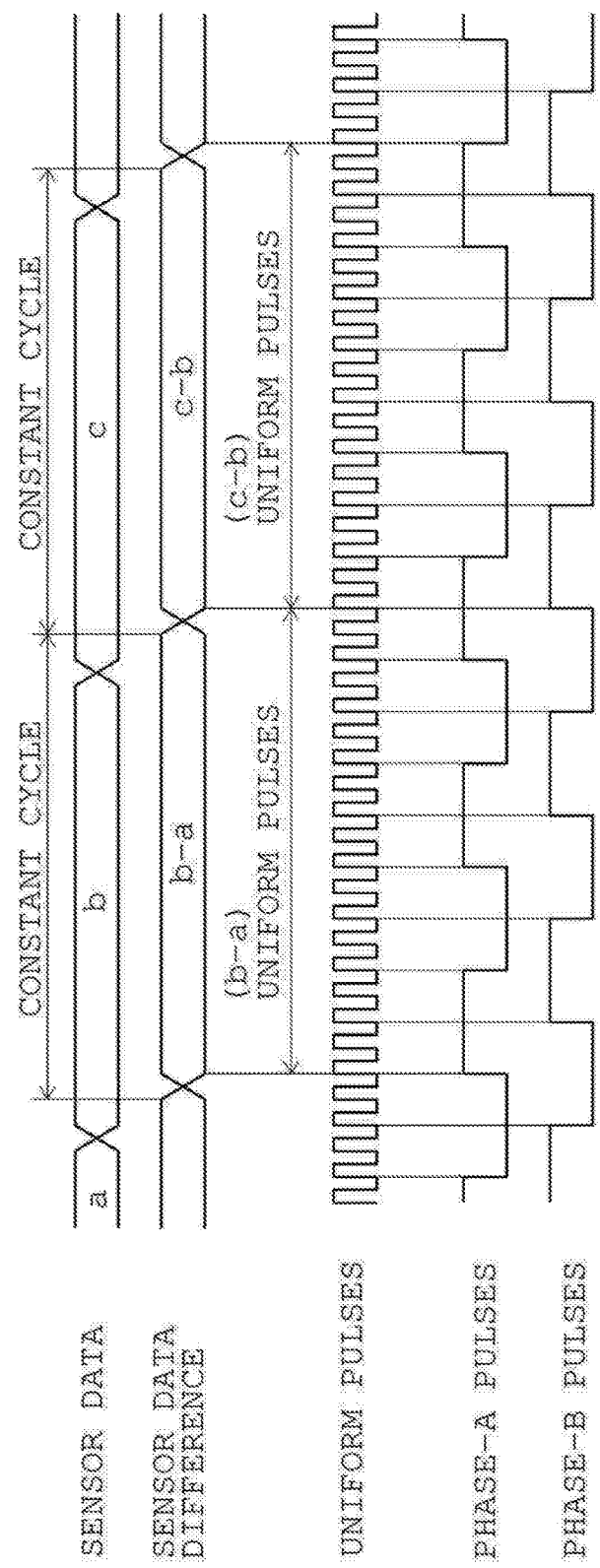

The controller 17 described above outputs the digital position signal from the 1T sensor section or the 16T sensor section, as sensor data, to a difference computation circuit 51, as shown in FIG. 12(*a*). The difference computation circuit 51 reads the sensor data in constant cycles, computes a difference between the sensor data in the current cycle and the sensor data in the preceding cycle, and outputs the difference to a downstream pulse conversion circuit 52. The difference computation circuit 51 further identifies the direction of the rotation of the shaft 10*a* on the basis of the computed difference and outputs a rotational direction identification signal to a pulse generation circuit 53.

The pulse conversion circuit 52 converts the inputted difference into uniform pulses that are uniform over a constant cycle, as shown in FIG. 12(*b*). The pulse generation circuit 53 then generates the phase-A pulse signal on the basis of the inputted uniform pulses and rotational direction identification signal and further generates the phase-B pulse signal that is delayed by ¼ cycle with respect to the phase-A pulse signal. The number of pulses in each of the phase-A and phase-B pulse signals, that is, the pulse rate that is the ratio between the amount of rotation and the number of generated pulses is assumed to be set at an arbitrary value by an external setting operation section (not shown) from which the arbitrary value is inputted via the field bus 19*a* described above.

Unlike the configuration described above, in a typical pulse encoder using an optical sensor, in which a disk-shaped glass plate directly connected to a shaft is used, the glass plate could be broken when impact acts thereon. Further, a light emitting device and a light receiving device based on optics each have a relatively short life and keep deteriorating due to heat. Therefore, pulses may not be outputted or the duty ratio of the pulses may change from 50% in some cases. Further, when condensation occurs on an optical portion or dust or any other foreign matter intrudes, malfunction immediately occurs, the encoder itself cannot be used, and other problems occur.

In this regard, the rotation-detecting apparatus 10 according to the present embodiment, which uses no optical sensor of related art, is allowed to function as a pulse encoder that outputs the phase-A, phase-B, and phase-Z pulse signals on the basis of the absolute data. The rotation-detecting apparatus 10 therefore excels in durability and has a prolonged life or can solve the problems described above. Further, the rotation-detecting apparatus 10 is configured to be capable of changing the setting of the pulse rate on the basis of a setting value inputted from the setting operation section described above. Therefore, a variety of manufacturing facility reserve parts on a pulse rate basis are not required to be prepared, unlike in related art, and the rotation-detecting apparatus 10 therefore excels in versatility.

As described above, the rotation-detecting apparatus 10 according to the present embodiment includes the rotor coil 22, which is disposed in the rotor, the detection coils 21*a* and 21*b*, which are disposed in each of the stators, the control circuit (controller 17 and contact output circuit 23) that processes the detection signals induced in the detection coils 21*a*, 21*b* when the rotor coil 22 is excited with the excitation signal to detect the relative angle of rotation between the rotor and the stators, and the communication means for data communication with an external apparatus. The control circuit has the function of outputting a switch signal that turns on and off at a preset angle of rotation on the basis of the detection signals, and the control circuit is configured to allow the external apparatus to change the setting of the angle of rotation associated with the switch signal via the communication means.

Since the thus configured rotation-detecting apparatus 10 can detect the relative angle of rotation between the rotor and the stators on the basis of the detection signals induced in the detection coils 21a and 21b, unlike with a mechanical cam, the problems such as wear of the cam and positional shift, can be solved. Further, since the rotation-detecting apparatus incorporates the control circuit and outputs the switch signal, the overall size of the rotation-detecting apparatus can be reduced. Moreover, not only can the switch signal be outputted independently of the external apparatus, but also the external apparatus is allowed to change the setting of the angle of rotation associated with the switch signal.

Further, the control circuit described above has the speed limit detection function of measuring the angle of rotation per a predetermined period on the basis of the detection signals and outputting a switch signal that turns on and off in accordance with a result of comparison between the measured angle of rotation and a predetermined threshold, and the control circuit is configured to allow the external apparatus to change the setting of the predetermined threshold associated with the measured angle of rotation per the predetermined period via the communication means.

The thus configured rotation-detecting apparatus 10 requires no movable portion or other components, for example, in the conventional centrifugal-force-based speed switch described above can be omitted, whereby the problem of abnormal action can be solved. Further, since the control circuit is built in the rotation-detecting apparatus, a configuration generally suitable for overall size reduction can be achieved. Moreover, not only can the switch signal be outputted independently of the external apparatus, but also the external apparatus is allowed to change the setting of the predetermined threshold associated with the measured angle of rotation per the predetermined period.

Each of the rotor and the stators may instead be formed of a plate member made of a magnetic material in place of the multilayer substrates 12, 11u, and 11d described above. Further, the frequency of the excitation signal is not limited to the high frequency described above and may be changed as appropriate in accordance with the material of the plate member.

In any case, accommodating the substrates that form the rotor, the stators, and the control circuit in the single outer shell case allows a simpler, more inexpensive configuration.

The present invention is not limited only to the embodiment described above or the embodiment illustrated in the drawings, and a variety of changes or extensions can be made thereto.

A multi-rotation detection configuration in which the number of rotations and the angle of rotation of the shaft 10a are simultaneously detected may be employed. In this case, for example, the shaft 10a is provided with a reduction gear, and a counter is incremented whenever the shaft 10a rotates to count the number of rotations. Also in the multi-rotation-detection-type rotation-detecting apparatus 10, the electronic cam function and the speed limit detection function described above may be provided, and the angle of rotation θ associated with the cam switch signal and the setting of a predetermined threshold of a measured number of rotations per predetermined period may be changed via the field bus 19a by the external apparatus described above.

As a result, quick response in the electronic cam function, easy setting of the ON/OFF timing unlike a mechanical cam, and other advantageous effects provided in the embodiment described above can be provided. Further, in the speed limit detection function, the controller 17 measures the number of rotations per the predetermined period on the basis of the detection signal described above and outputs a switch signal that turns on and off in accordance with a result of the comparison between the measured number of rotations and a predetermined threshold. The calculation of the rotational speed can therefore be performed in an extremely simple, precise manner. Further, high-speed ON/OFF control can be performed independently, for example, of a network, whereby construction of a reliable system and other advantageous effects provided in the embodiment described above can be provided.

Further, when the multi-rotation detection configuration, in which an absolute position within one rotation is detected as the angle of rotation or the absolute position is detected along with a number of rotations, is employed, the operation efficiency of facilities to which it is applied can be improved, as compared with a type in which a relative position is detected.

The invention claimed is:

1. A rotation-detecting apparatus, comprising:
   a rotor and stators;
   a rotor coil disposed in the rotor;
   detection coils disposed in each of the stators;
   a control circuit that processes detection signals induced in the detection coils when the rotor coil is excited with an excitation signal to detect a relative angle of rotation between the rotor and the stators; and
   a communication unit for data communication with an external apparatus,
   wherein the communication unit is connected to the external apparatus via a cable, and the control circuit has a function of outputting a switch signal that turns on and off at a preset angle of rotation based on the detection signals and is configured to allow the external apparatus to change a setting of the angle of rotation associated with the switch signal via the communication unit.

2. The rotation-detecting apparatus according to claim 1, further comprising an outer shell case that accommodates the rotor, the stators, and a substrate of the control circuit.

3. The rotation-detecting apparatus according to claim 2, wherein the rotation-detecting apparatus has a multi-rotation detection configuration in which an absolute position within one rotation is detected as the angle of rotation or the absolute position is detected along with a number of rotations.

4. The rotation-detecting apparatus according to claim 1, wherein the rotation-detecting apparatus has a multi-rotation detection configuration in which an absolute position within one rotation is detected as the angle of rotation or the absolute position is detected along with a number of rotations.

5. A rotation-detecting apparatus comprising:
   a rotor and stators;
   a rotor coil disposed in the rotor;
   detection coils disposed in each of the stators;
   a control circuit that processes detection signals induced in the detection coils when the rotor coil is excited with an excitation signal to detect a relative angle of rotation between the rotor and the stators; and
   a communication unit for data communication with an external apparatus,
   wherein the communication unit is connected to the external apparatus via a cable, and the control circuit has a speed limit detection function of measuring an angle of rotation per a predetermined period based on the detection signals and outputting a switch signal that turns on and off in accordance with a result of comparison between the measured angle of rotation and a predetermined threshold and is configured to allow the external apparatus to change a setting of the predetermined threshold associated with the measured angle of rotation per the predetermined period via the communication unit.

6. The rotation-detecting apparatus according to claim 5, further comprising an outer shell case that accommodates the rotor, the stators, and a substrate of the control circuit.

7. The rotation-detecting apparatus according to claim 6, wherein the rotation-detecting apparatus has a multi-rotation detection configuration in which an absolute position within one rotation is detected as the angle of rotation or the absolute position is detected along with a number of rotations.

8. The rotation-detecting apparatus according to claim 5, wherein the rotation-detecting apparatus has a multi-rotation detection configuration in which an absolute position within one rotation is detected as the angle of rotation or the absolute position is detected along with a number of rotations.

\* \* \* \* \*